(12) United States Patent
Thompto et al.

(10) Patent No.: US 10,671,539 B2
(45) Date of Patent: *Jun. 2, 2020

(54) CACHE LINE REPLACEMENT USING REFERENCE STATES BASED ON DATA REFERENCE ATTRIBUTES

(71) Applicant: INTERNATIONAL BUSINESS MACHINES CORPORATION, Armonk, NY (US)

(72) Inventors: Brian W. Thompto, Austin, TX (US); Bernard C. Drerup, Austin, TX (US); Mohit S. Karve, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,864

(22) Filed: Oct. 15, 2018

(65) Prior Publication Data
US 2020/0117607 A1   Apr. 16, 2020

(51) Int. Cl.
*G06F 12/08* (2016.01)
*G06F 12/12* (2016.01)
(Continued)

(52) U.S. Cl.
CPC ...... *G06F 12/0871* (2013.01); *G06F 12/0862* (2013.01); *G06F 12/0875* (2013.01); *G06F 12/12* (2013.01); *G06F 2212/451* (2013.01)

(58) Field of Classification Search
CPC ............. G06F 12/0871; G06F 12/0862; G06F 12/0875; G06F 2212/451
See application file for complete search history.

(56) References Cited

U.S. PATENT DOCUMENTS 5,546,559 A * 8/1996 Kyushima ............. G06F 12/127
711/133
9,753,862 B1 * 9/2017 Drerup .................. G06F 12/122
(Continued)

OTHER PUBLICATIONS

Thompto et al., "State and Probability Based Cache Line Replacement", U.S. Appl. No. 16/263,016, filed Jan. 31, 2019. Number.

*Primary Examiner* — Glenn Gossage
(74) *Attorney, Agent, or Firm* — Gregory M. Nordstrom

(57) ABSTRACT

A method comprises receiving input reference attributes from a data reference interface and selecting a replacement data location of a cache to store data. The replacement data location is selected based on the input reference attributes and reference states associated with cached-data stored in data locations of the cache and an order of state locations of a replacement stack storing the reference states. The reference states are based on reference attributes associated with the cached-data and can include a probability count. The order of state locations is based on the reference states and the reference attributes. In response to receiving some input reference attributes, reference states stored in the state locations can be modified and a second order of the state locations can be determined. A reference state can be stored in the replacement stack based on the second order. A cache can comprise a data reference interface, reference attributes, reference states, cached-data locations, a replacement stack, and a cache manager. The cache manager can perform the method.

20 Claims, 7 Drawing Sheets

(51) Int. Cl.
*G06F 12/0871* (2016.01)
*G06F 12/0862* (2016.01)
*G06F 12/0875* (2016.01)

(56) References Cited

U.S. PATENT DOCUMENTS

| | | | |
|---|---|---|---|
| 2001/0001873 A1* | 5/2001 | Wickeraad | G06F 12/121 |
| | | | 711/136 |
| 2008/0147982 A1* | 6/2008 | Matick | G06F 12/122 |
| | | | 711/134 |
| 2010/0235576 A1* | 9/2010 | Guthrie | G06F 12/0811 |
| | | | 711/122 |
| 2011/0145506 A1 | 6/2011 | Cherukuri et al. | |
| 2012/0246411 A1* | 9/2012 | Birka | G06F 12/121 |
| | | | 711/133 |
| 2014/0075125 A1 | 3/2014 | Biswas et al. | |
| 2015/0186280 A1 | 7/2015 | Lepak et al. | |
| 2015/0350365 A1* | 12/2015 | Khakpour | H04L 67/2852 |
| | | | 709/213 |
| 2016/0062916 A1* | 3/2016 | Das | G06F 12/128 |
| | | | 711/133 |
| 2017/0052905 A1 | 2/2017 | Lin et al. | |
| 2019/0138449 A1* | 5/2019 | Tian | G06F 12/0811 |

\* cited by examiner

CACHE LINE REPLACEMENT USING REFERENCE STATES BASED ON DATA REFERENCE ATTRIBUTES

BACKGROUND

A computing system can use a cache to store data. Storing data can require selecting a location in the cache to store data based on particular selection criteria. The present disclosure relates to caching data in computing systems. More particularly, the present disclosure relates to selecting locations in a cache to store data and criteria used to select particular locations to store the data.

SUMMARY

In embodiments, a cache comprises a data reference interface, cache-line reference attributes, reference states based on the cache-line reference attributes, a first storage medium having cached-data locations, a second storage medium having state locations, a replacement stack, and a cache manager. The replacement stack comprises cached-data reference states stored in the state locations of the second storage medium. Each of the cached-data reference states stored in the state locations corresponds to a respective cached-data location of the first storage medium. Each of the cached-data reference states is based on cache-line reference attributes associated with cache-line data stored in a corresponding cached-data location. The cached-data reference states are stored in the state locations of the replacement stack according to a first order of state locations among the state locations of the replacement stack. The first order of state locations is based on a set of the cache-line reference attributes and the cached-data reference states.

In response to receiving reference attributes, among the cache-line reference attributes, from the data reference interface, the cache manager selects a replacement data location, from among the cached-data locations, to store cache-line data associated with the reference attributes received from the data reference interface. The cache manager selects the replacement data location based on the received reference attributes and the first order of state locations.

In some embodiments the cache manager receives second reference attributes from the data reference interface. In response, the cache manager modifies a cached-data reference state stored in a state location of the replacement stack. In response to modifying the cached-data reference state, the cache manager can determine a second order of the state locations, based on the set of reference attributes and the cached-data reference states stored in the state locations.

In embodiments, a cached-data reference state can include a probability count based on cache-line reference attributes of cache-line data stored in a corresponding cached-data location of the first storage medium. The cache manager can select the replacement data location based on the probability count included in a cached-data reference state associated with cache-line data stored in the replacement data locations. In response to receiving the second cache-line reference attributes, the cache manager can increment and/or decrement the probability count included in a cached-data reference state. The cache manager can increment a probability count in response to an "Nth" occurrence of installing cache-line data in a cached-data location of the cache, and the cache manager can decrement a probability count based on a cached-data reference state and a state location of the replacement stack storing the cached-data reference state.

The cache manager can select the state location based on the first order of the state locations.

A method for managing a cache comprises receiving first reference attributes from a data reference interface and, in response, selecting a replacement data location to store cache-line data associated with the first reference attributes. The replacement data location is included among cached-data locations of a storage medium, based on cached-data reference states stored in state locations of the replacement stack and a first order of state locations of the replacement stack. The cached-data reference states are based on reference attributes associated with cache-line data stored in a respective cached-data location of the storage medium, and the first order of state locations is based on a set of the reference attributes associated with the cache-line data stored in the cached-data locations.

The method can include modifying cached-data reference states, stored among the state locations of the replacement stack, in response to receiving second cache-line reference attributes from the data reference interface. In response to modifying a cached-data reference state, the method can include determining a second order of the state locations of the replacement stack. The cached-data reference states can include a probability count, and the method can include storing cached-data reference states in state locations of the replacement stack, and/or selecting a replacement data location, among the cached-data locations, based on a probability count included in a cached-data reference state. The method can include modifying probability counts in one or more cached-data reference states in response to receiving second reference attributes from the data reference interface. According to the method, a probability count can be incremented in response to an "Nth" occurrence of installing cache-line data in a cached-data location, and a probability count can be decremented based on a cached-data reference state and a state location of the replacement stack storing the cached-data reference state. The state location can be based on the selection order The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
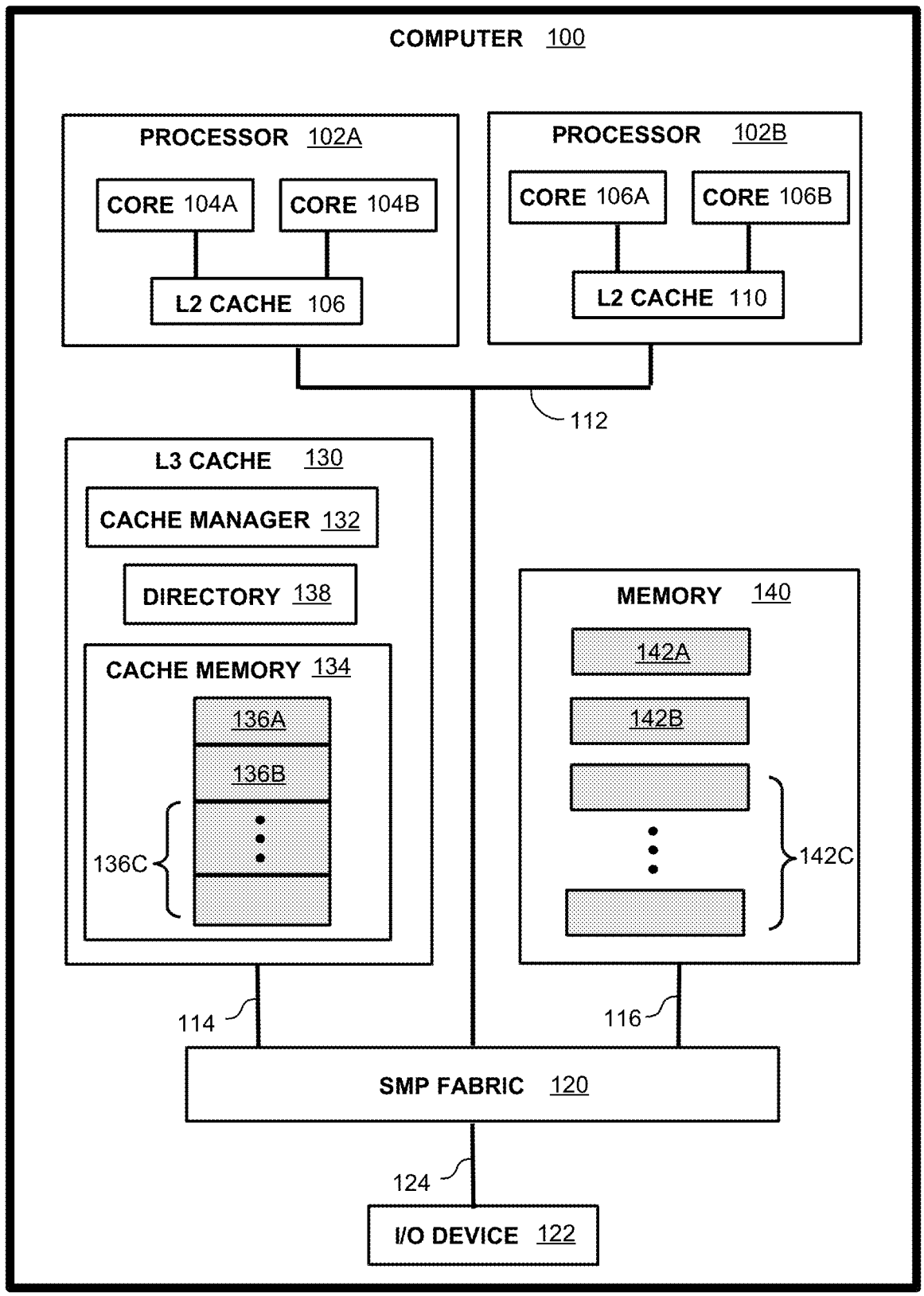
FIG. 1 is a block diagram illustrating an example processor core, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to caching data in computing systems. More particular aspects relate to selecting a location in a cache storage (e.g., a memory or storage device) of a computing system for storing data. In embodiments of the disclosure (hereinafter, "embodiments"), data stored in a cache can include, for example, instructions, and/or data, used by a processor (e.g., in executing instructions), data used by Input/Output (I/O) devices, and/or data retrieved over a network. The disclosure features systems and methods to select locations within a cache storage to store data associated with a data reference. While the disclosure is not necessarily limited to such applications, various aspects of the disclosure may be appreciated through a discussion of various example embodiments using this context.

Computing systems can employ one or more caches to store data in a manner that can improve aspects of computing system performance, such as processor access latency to data, and/or reducing transfer of data on various interconnects (e.g., data buses) within the system. For example, in a computing system, a cache can include a storage medium and the cache storage can be relatively faster to access data stored in the cache (e.g., data stored in the storage medium of the cache) in comparison to other storage media (e.g., a main memory, a disk drive, or a server in a distributed or networked computing system). A cache storage can be, for example, a memory, a disk, a solid state drive, or another type of storage device. As used herein, "cache memory" refers to any form of storage used in a computing system to store data, and, "cache" refers interchangeably to a cache (e.g., inclusive of elements of a cache, such as a cache memory and/or logic to manage the contents of the cache memory) and a cache memory included in the cache.

In elements of a computing system can reference data stored in a particular storage medium (e.g., a particular memory or storage device) and storing, or "caching", data in a cache can allow such elements (e.g., a processor,) for example, to access (e.g., read, write, or modify) that data much more quickly (i.e., at a lower access latency) than if those elements accessed that data in a slower storage medium (e.g., a slower memory, such as a main memory. Caching data can, correspondingly, improve the performance of the computing system (e.g., by improving the performance of programs executing on a processor).

As used herein, the terms "reference data" and "data reference" refer, interchangeably, to any use of, or access to, data by an element of a computing system, such as (but not limited to) a processor reading, writing, and/or modifying a data; and/or, an element of a computing system (e.g., a processor, I/O device, another cache, or another computer) retrieving or storing data in a computing system. However, this is not intended to limit embodiments, and it would be apparent to one of ordinary skill in the art that various elements of a computing system can reference data. For example, data in a cache can be referenced by an I/O device, such as an I/O adapter, or can be referenced by various types of processors, such as general purpose and/or co-processors.

In response to a data reference (e.g., a read or a write) associated with data not stored in a cache, a cache can store, or "install", that data in a storage locations of that cache. As used herein, "installment data" refers to data to install in a cache and, correspondingly, to "install data" refers to storing installment data in a cache. A cache can install data, for example, in response to a processor reference to data, such as a processor fetching, or pre-fetching, an instruction or an operand of an instruction. In another example, a computing system can include a plurality of caches and can install data in a particular cache, among that plurality of caches, in response to that data being discarded, or "evicted" by another cache. Additionally, or alternatively, in embodiments a cache can install data in a cache in response to that data being referenced by another cache, such as another cache referencing that data in that other cache, or that other cache requesting the data to store in that other cache.

In response to a reference to particular data, a cache can determine if that data is stored in the cache. For example, a processor can execute an instruction that references data in a memory (e.g., a main memory, or another cache) and a cache can receive information associated with that reference (e.g., a cache can "snoop" references to data in a memory, or another cache, and/or receive reference information associated with a data reference). The cache can determine if that data is stored in the cache and, if the data is not stored in the cache, the cache can select a location in the cache (e.g., a location in a storage medium included in the cache) and can install the data in that location. Additionally, in an embodiment, in response to a data reference, a cache can modify information corresponding to data, associated with the data reference, being stored in the cache.

As previously described, computing systems can include multiple caches. For example, in a computing system, two or more of a plurality of processors can each include a cache. In another example, computing system can include a hierarchical cache, which can comprise, for example, "Level 1" (L1), "Level 2" (L2), and "Level 3" (L3) caches. Caches "higher" in a hierarchical cache can be, for example, faster (and/or smaller) than caches "lower" in the hierarchy. For example, in a hierarchy comprising L1, L2, and L3 caches, an L1 cache can be a higher level cache in the hierarchy (e.g., comparatively faster, in terms of access latency to data stored in the L1 cache) than an L2 and/or an L3 cache, and an L2 cache can be higher in the hierarchy (e.g., faster) than an L3 cache.

FIG. 1 illustrates an example embodiment comprising a computer utilizing caches, according to aspects of the disclosure. In FIG. 1, computer 100 comprises processors 102A and 102B (collectively, "processors 102"), L3 cache 130, memory 140, I/O device 122, and "symmetric multiprocessing (SMP)" fabric 120.

Processors, such as in the example of FIG. 1, can comprise multiple processing "cores", such as illustrated in FIG. 1 by processors 102A and 102B comprising, respectively, cores 104A and 104B, and 106A and 106B. As used herein, a "processor" can comprise any form and/or arrangement of a computing device using, or capable of using, data stored in a cache, including, for example, pipelined and/or multi-cycle processors, graphical processing units (GPUs), cores of a multi-core processor (such as 102A and/or 102B), and/or neural networks. However, this is not intended to limit embodiments, and it would be appreciated by one of ordinary skill in the art that embodiments can employ other varieties and/or architectures of processors, and/or processor cores, within the scope of the disclosure.

A memory, such as 140 in FIG. 1, can be a random access memory (RAM) and can, additionally, be a "main memory" of a computer, or computing system. However, this is not intended to limit embodiments and in embodiments a memory, such as 140, can be any form of storage medium, such as a flash memory, a solid state storage (SSD) device (e.g., an SSD disk drive), a disk drive, or a "server" computer in a distributed and/or networked computing system. Similarly, in embodiments an I/O device, such as 122, can comprise an I/O device per se (e.g., a disk drive, or a communications or network device), or can comprise an I/O subsystem, such as an I/O adapter, I/O bridge or switch, or another I/O interface coupled to an I/O device per se.

A memory can be organized as a set of data locations to store data in the memory, such as memory 140 illustrated in FIG. 1 comprising memory locations 142A, 142B, and 142C (indicated, in FIG. 1, as a set of additional memory locations similar to 142A and/or 142B). Such memory locations can correspond to particular units of storage, such as a "page", comprising, for example, 4096 bytes of data. Such memory locations can alternatively, or additionally, include units of data corresponding to units of data stored in a cache, such as a "cache line", described in more detail further. Accordingly, in of FIG. 1, memory locations 142A, 142B, and locations among memory locations 142C, can each comprise a cache line unit of data stored in memory 140. As used herein, "memory lines 142" refers, collectively, to memory lines included in locations 142A, 142B, and locations among memory locations 142C.

FIG. 1 further illustrates processors 102A and 102B each including respective L2 caches 106 and 110, which can store data accessed by cores of processors 102. As previously described, in an embodiment access to data stored in a cache can improve performance of a computing system. For example, in the example of FIG. 1, access by cores of processors 102A to data stored in L2 cache 106, and/or cores of processor 103B to data stored in L2 cache 110, can be faster than access by those cores to data stored in L3 cache 130. Similarly, in the example of FIG. 1, access by cores of processor 102A, and/or cores of processor 102B, to data stored in L3 cache 130 can be faster than access by cores of processors 102, or L2 caches 106 and/or 110, to data stored in memory 140. Accordingly, access (e.g., data references) by cores of processors 102, or by L2 caches 106 and/or 110, to data stored in caches 106, 110, and/or 130 can improve the performance of computer 100, and/or a computing system including computer 100, in comparison to accessing that data in memory 140.

Additionally, in computing systems, an I/O device can access data stored in a cache, and access to data in a cache by an I/O device can improve the performance of a computer, and/or a computing system. For example, in FIG. 1 access by I/O device 122 to data stored in L3 cache 130, and/or one of L2 caches 106 and 110, can improve the performance of computer 100, and/or a computing system including computer 100, in comparison to, for example, access by I/O device 122 to data stored in memory 140.

In an embodiment, elements of a computer can interconnect by means of an SMP fabric. To illustrate, the example embodiment of FIG. 1 depicts processors 102 connecting to SMP fabric 120 by means of interface 112, L3 cache 130 connects to SMP fabric 120 by means of interface 114, memory 140 connects to SMP fabric 120 by means of interface 116, and I/O device 122 connects to SMP fabric by means of interface 124. Such an SMP network can operate to exchange data (e.g., data referenced by a processor and/or stored in a cache or memory) and/or logic signals (e.g., status indicators, protocol commands and/or responses, etc.) among processors, caches, and/or memories.

Interfaces of an SMP fabric—such as 112, 114, and/or 116, in FIG. 1—in an embodiment can comprise data, status of data and/or a data reference, and/or transfer protocol commands or responses, to facilitate transferring data among processors, caches, memories, and/or I/O devices in a computer, such as 100. As used herein, "data reference interface" refers to any interface—such as the examples of 112, 114, and/or 116 in FIG. 1—that can communicate among elements of a computing system such as processors, caches, memories, and/or I/O devices data and/or attributes of data subject to a data reference. An SMP fabric, such as 120, can include switches (e.g., packet and/or crossbar switches), data buses and/or data links, and/or other interconnection mechanisms, to interconnect data reference interfaces within an SMP fabric, such as 120. Similar to interfaces 114 and 116, an interface, such as 124, coupling an I/O device, such as 122, to SMP fabric 120 can comprise a data reference interface.

FIG. 1 further depicts L3 cache 130 comprising cache manager 132, cache memory 134, and directory 138. In an embodiment, a cache memory, such as 134, can be any type of memory (e.g., a dynamic random access memory, a register stack, a disk or solid state storage drive, etc.). Caches can store data in a cache memory, such as 134, in "cache line" units of a particular amount of data, such as 128 or 256 bytes. A cache line in a cache memory can store, or comprise, for example, a copy of data stored in another memory, such as another cache or memory. To illustrate, FIG. 1 depicts cache memory 134 comprising cache lines 136A, 136B, and additional cache lines 136C (indicated, in FIG. 1, as a set of additional cache lines in cache memory 134 similar to 136A and/or 136B), each of which can store a cache line unit of data. As used herein, "cache lines 136" refers, collectively, to cache lines 136A, 136B, and cache lines comprising 136C. Also, as used herein, "cache line" refers interchangeably to a unit amount of data stored in a cache and/or other memory, a location in a cache and/or other memory for storing a unit amount of data, and the data stored in a cache line of a cache or other memory, according the context of the reference.

As shown in FIG. 1, processors 102A and 102B include respective L2 caches 106 and 110. While not shown in FIG. 1, in addition to, or in lieu of, respective L2 caches 106 and 110, each of cores 104A, 104B, 106A, and/or 106B can include an L1 cache. In an embodiment, L2 caches 106 and/or 110, and/or L1 caches included in a processor—such as can be included in one of cores 104A, 104B, 106A, and/or 106B—can be a cache similar to L3 cache 130, and/or can operate in a manner similar to the manner of operation of L3 cache 130 as described herein.

As previously described, a cache can store data corresponding to (e.g., a copy of) data in another memory, such as data in a main memory or another cache. For example, in FIG. 1 each of cache lines 136, in cache memory 134, can store a copy of data in a respective memory line among memory lines 142 in memory 140. Cache line 136A can store a copy of memory line 142A, for example, and cache line 136B can store a copy of memory line 142B. While not shown in FIG. 1, in another example lines of L2 caches 106 and/or 110 can store a copy of data stored in respective lines among cache line 136 of L3 cache 130.

A cache manager, such as 132 in the example embodiment of FIG. 1, can manage the contents of a cache (e.g., the data stored in a cache memory, such as data stored in cache lines 136 of cache memory 134). For example, in response to a reference to particular data, cache manager 132 can determine if that data is stored in L3 cache 130, and whether or not to install that data in L3 cache 130. In response to determining to install that data in the cache, cache manager 132 can select a particular location within cache memory 134 which to install that data, such as a particular cache line, among cache lines 136, to install (i.e., store) that data.

A data reference can include "reference information" associated with the referenced data (e.g., an address or location of the data in a memory or another cache), and a cache manager can utilize such reference information to determine if the data is stored in a cache. A cache manager can receive such reference information, and/or referenced data, by means of a data reference interface. For example, with reference to FIG. 1, processor 102A or 102B can reference data stored in memory 140, and the reference can result in communications—such as by means of interfaces 112 and/or 116—through SMP fabric 120. Cache manager 132 can receive the reference information, and/or data, associated with the communications through SMP fabric 120 (e.g., by means of inputs to L3 cache 130 from interface 114, or by means of other inputs to L3 cache 130, not shown in FIG. 1). In response to receiving the reference information and/or the data, cache manager 132 can determine if a copy of the referenced data is stored in cache memory 134, and/or can install the data in a cache line among cache lines 136 to store the data.

In computing systems, a cache, and/or a cache manager, can utilize a cache directory to manage the contents of a cache and FIG. 1 illustrates L3 cache 130 including cache directory 138. Such a cache directory can include information describing data stored in the cache, such as whether or not data stored in cache lines of the data is valid, or invalid. Valid data can comprise, for example, data stored in a cache that has not been modified in any other memory and/or cache in a computing system. For example, with reference to FIG. 1, valid data in cache line 136A can be a copy of data stored in memory line 142A and can be utilized (e.g., accessed or reference from) L3 cache 130, in lieu of memory line 142A, while the data stored in memory line 142A has not been modified by any element of computer 100 or a computing system including computer 100. Accordingly, a valid cache line can comprise a cache line storing valid data.

Conversely, invalid data, can comprise, for example, data stored in a cache that has been modified in another memory and/or cache in a computing system, or that has been discarded (e.g., evicted) from a cache. Data stored in a cache can be invalidated by a "cache line invalidate" operation (associated with, for example, modifying data) in a computer or computing system. An invalid cache line can comprise, for example, a cache line storing invalid data, and/or a cache line that has not yet had data installed in it (e.g., an empty, or unused, cache line).

To illustrate invalidating data within a cache, using the example embodiment of FIG. 1 a processor among processors 102 can modify, in memory 140 or another cache (e.g., L2 cache 106 or 110), a copy of data stored in cache line 136A of L3 cache 130. In response, computer 100 can invalidate all other, unmodified copies of that data, such as the copy of that data stored in cache line 136A, and cache 130 can denote (e.g., in directory 138) that cache line 136A is invalid. In another example, again with reference to FIG. 1, each of cache lines 136C can be unused, or empty, in that at a particular time cache 130 has not previously installed data in any of cache lines 136C. Accordingly, cache 130, or cache manager 132, can denote (e.g., in directory 138) that cache lines 136C are invalid. As used herein, "cache" refers interchangeably to "a cache as a whole", such as illustrated by the example of cache 130 in FIG. 1, and an element of a cache—such as cache manager 132, cache memory 134, and/or cache directory 138—included in, and/or a function of, a cache, according to the context of a reference to "a cache".

A cache, such as cache 130 in the example embodiment of FIG. 1, can install data in response to another cache installing, referencing, and/or evicting that data. Using the example of FIG. 1, in response to L2 cache 106 installing data in a line of L2 cache 106, L3 cache 130 can install that data in a cache line among cache lines 136. In response to a reference to data stored in L2 cache 106, L3 cache 130 can install that data (e.g., a copy of the data stored in L2 cache 106) in a cache line among cache lines 136. In response to L2 cache 106 evicting data from L2 cache 106, L3 cache 130 can install that data in a cache line among cache lines 136. Additionally, a cache can install data requested from another cache. For example, in FIG. 1, L2 cache 106 can request, from L3 cache 130, data stored in a line among lines 136 in L3 cache 130, and L2 cache 106 can install that data in a location (e.g., a cache line) of L2 cache 106.

To store installment data in a cache a cache can select a "replacement cache line", in a cache memory, to install that data. Such a replacement cache line can comprise an invalid and/or a valid cache line stored in a cache. As used herein, only for purposes of illustrating the disclosure, but not intended to limit embodiments, "replacement cache line", or "replacement cache lines", refers to a location in a cache (e.g., a location in a cache memory and/or register set) in which to install data not stored in the cache.

In conjunction with installing data in a valid cache line (e.g., a cache line storing valid data), an embodiment can evict data stored in that cache line. For example, with reference to FIG. 1, all of cache lines 136 in L3 cache 130 can contain valid data (e.g., all of cache lines 136 can be denoted in directory 138 as valid). In response to a reference to data not stored in L3 cache 130, cache 130 (or, cache manager 132) can select a replacement line, among cache lines 136, in which to install the referenced data. Alternatively (or, additionally), cache lines among 136C can be invalid (e.g., unused) and, in response to a reference to data not stored in L3 cache 130, cache 130 (or, cache manager 132) can select a replacement line, among cache lines 136C to store installment data.

A computer, and/or element of a computer, such as computer 100 in FIG. 1 (or, a computing system including a computer such as 100), can repeatedly reference particular data. For example, in a computer, or computing system, a processor can re-use (e.g., re-execute) a particular instruction, or set of instructions, multiple times, and/or can modify a particular instruction operand, or set of operands, multiple times. In another example, in managing data stored in memories and/or caches, elements of a computing system (e.g., a processor, or a higher level cache in a cache hierarchy) can repeat a reference to data stored in a memory and/or cache. In selecting a replacement cache line, from among valid cache lines in a cache, in an embodiment a cache can improve the performance of a computer, or computing system, by selecting a replacement cache line from among valid cache lines storing data less likely to be "re-referenced" (e.g., re-used, or repeatedly referenced) in comparison to data stored in other valid cache lines of a cache.

In computing systems, a cache (e.g., such as 130 in FIG. 1) can apply a variety of criteria to select a replacement cache line in the cache. For example, a cache can record (e.g., in a cache directory) a frequency of reference to data in each of the cache lines in a cache and can use a "least frequently used (LFU)" criteria to select, as a replacement cache line, a cache line storing data that has been referenced less frequently than other cache lines in the cache. In another example, a cache can record (e.g., in a cache directory) a time of reference to data in each of the cache lines in a cache and can use a "least recently used (LRU)" criteria to select, as a replacement cache line, a cache line that has been referenced earlier in time than other cache lines in the cache.

However, criteria such as LFU, LRU, based simply on a number of times particular data is referenced or, respectively, a period of time in which data was last referenced, or combinations of these, can omit "reference attributes" associated with a reference to data, and/or the data referenced, in selecting a replacement cache line. Such reference attributes can comprise a data "requester", a "data source" of the referenced data, and/or particular attributes ("data attributes") of the data referenced. For example, in embodiments a data requester can comprise an element of a computing system, such as a processor, an I/O device, a memory, and/or a cache. Similarly, in an embodiment a data source can comprise an element of a computing system having data (or, a copy of data), such as a processor, an I/O device, a memory, and/or a cache.

Data attributes associated with referenced data can include a "reference class" of the data, such as the data being address translation data; the data being associated with a cache miss; data subject to a fetch, and/or a prefetch, of a processor instruction and/or instruction operand; or, the data subject to, or associated with, a cache invalidate operation. In addition to a reference class, data attributes can include a "reference category", such as "initial" reference and "re-reference" data. As used herein, "initial reference data" refers to data installed in a cache for a first time, and "re-reference data" refers to data to install, or data stored, in a cache that has been previously referenced in association with that cache, and/or a related memory or cache (e.g. another cache in a hierarchical cache). Accordingly, as used herein, "reference attributes" is defined as attributes of a data reference, and/or the referenced data itself, comprising a data requester, a data source, a reference class, and a reference category. Also, as used herein, "reference attributes associated with data" includes reference attributes associated with data references involving that data and, conversely, "reference attributes associated with a data reference" includes reference attributes associated with the referenced data.

Reference attributes can, individually or in combination, correspond to a probability of a repeat reference to data to install, and/or data stored, in a cache. "Re-reference probability", as used herein, refers to a probability of a repeat reference to data stored in a cache line corresponding to, or based on, reference attributes associated with that data, and/or a reference to that data. Data stored in cache lines can have "relatively higher" or, alternatively, "relatively lower" re-reference probabilities in comparison to that of data stored in other cache lines of a cache. As used herein, "relatively higher", "higher", "relatively lower", and "lower", in reference to re-reference probabilities, is understood to refer to re-reference probabilities associated with a cache line (e.g., data stored in a cache line) in comparison to that of other cache lines in a cache.

An embodiment can utilize reference attributes of data stored in a cache to associate (e.g., compute) a re-reference probability with cache lines storing data in that cache. Embodiments can select replacement cache lines based on re-reference probabilities corresponding to reference attributes and can select replacement cache lines from among cache lines storing data having a lower re-reference probability than other cache lines. Selecting replacement cache lines according to reference attributes associated with data stored in a cache can improve performance of a computer, and/or a computing system.

Embodiments can record reference attributes, and/or re-re-reference probabilities, associated with data to install and/or stored in a cache, using a "reference state" corresponding to a cache line storing the data (and/or an invalid cache line). As used herein, "reference state" refers to a data element (e.g., a bit vector) having data fields (e.g., bit fields) including and/or having a value based on reference attributes of data stored in a corresponding cache line of a cache. A reference state can comprise, for example, fields (e.g., bit fields) of a data element corresponding to one or more of a data requester, a data source, a reference class, a reference category, and/or a re-reference probability. A reference state can, additionally, include (or indicate) whether a corresponding cache line is valid or, alternatively, invalid. Accordingly, in an embodiment a cache can select a replacement cache line, from among a set of cache lines, based on reference states corresponding to each of the cache lines, to select a cache line having a lower re-reference probability in comparison to that of other cache lines in that cache.

Figure 2:
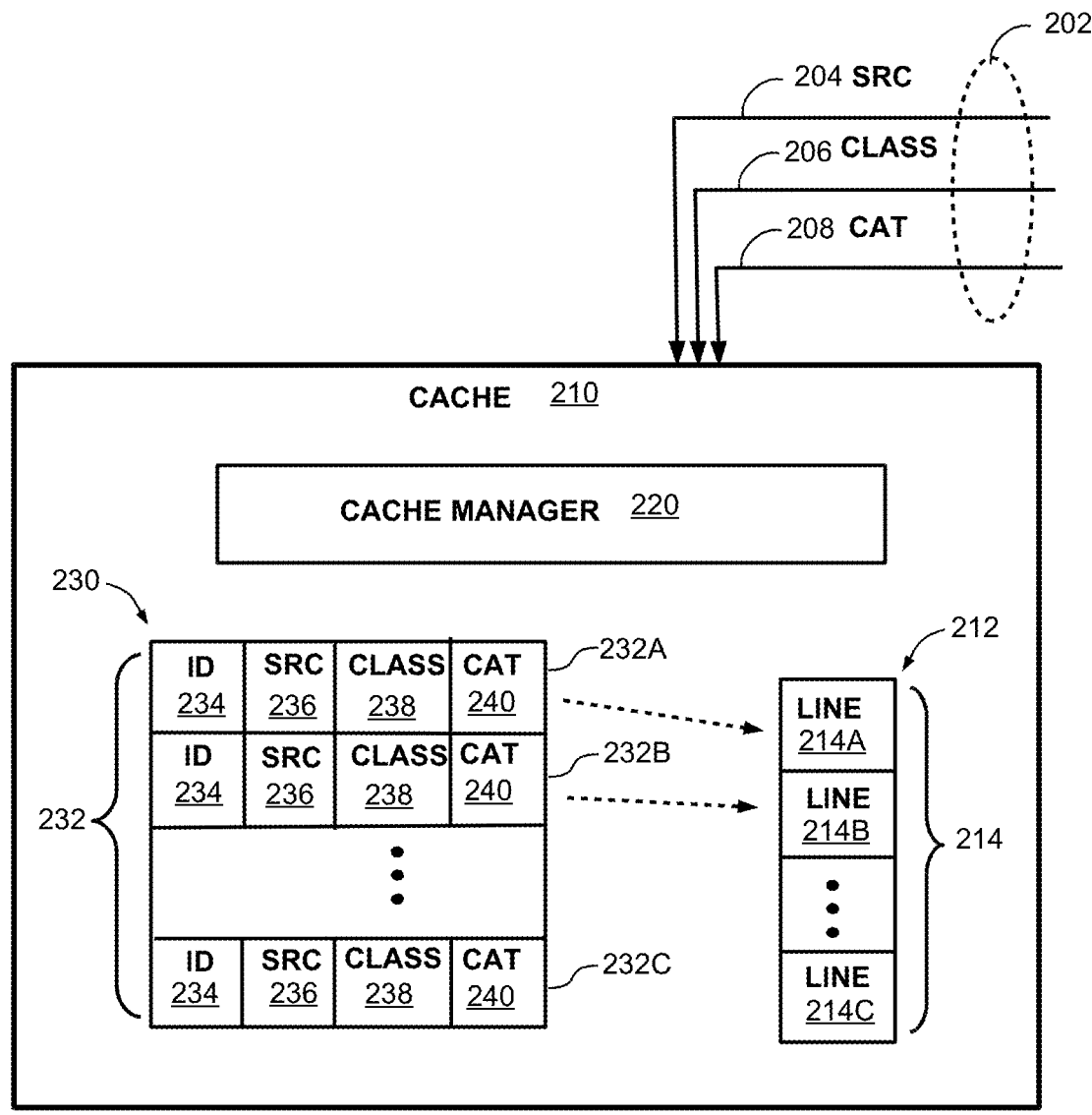
FIG. 2 is a block diagram illustrating an example caching system, according to aspects of the disclosure.

FIG. 2 illustrates an example embodiment comprising cache 210, which includes, in corresponding reference states, reference attributes associated with ("of") data stored in cache lines of a cache. In FIG. 2, cache 210 comprises cache manager 220, cache memory 212, and replacement stack 230. While FIG. 2 does not depict cache 210 including a cache directory, such as directory 138 in L3 cache 130 of FIG. 1, this is not intended to limit embodiments, and it would be apparent to one of ordinary skill in the art to include a cache directory in, or associated with, cache 210.

Additionally, while FIG. 2 illustrates cache manager 220 and replacement stack 230 as included in cache 210, this is not intended to limit embodiments, and a cache manager, such as 220, and/or a replacement stack, such as 230, need not be included in a cache itself, such as cache 210. It would be apparent to one of ordinary skill in the art that elements of a cache, such as 210, can be organized in any manner conducive to the design of a particular computer, or computing system.

In an embodiment, cache 210 can operate in a manner similar to that previously described in reference to L3 cache 130 in FIG. 1. Accordingly, cache memory 212 comprises a set of cache lines, 214, which includes lines 214A, 214B, and 214C. Cache manager 220 can manage data stored in a cache, such as described in reference to cache manager 132 of FIG. 1. For example, cache manager 220 can determine if referenced data is stored in a line among cache lines 214, can install data in in a line among cache lines 214, and/or can select a replacement cache line from among cache lines 214.

Embodiments can utilize a "replacement stack" to store reference states, and a replacement stack can comprise a memory (or, alternatively, for example, a set of hardware registers) having particular "state locations" to store reference states, and/or to facilitate selecting a replacement cache line. Accordingly, the example embodiment of FIG. 2 depicts replacement stack 230 comprising stack entries 232 and replacement stack 230 can be implemented in a memory stack entries 232 can comprise locations of the memory (or, equivalently, locations of replacement stack 230) to store reference states.

As illustrated in the example embodiment of FIG. 2, each of entries 232 can store a reference state corresponding to a cache line, among cache lines 214, in cache memory 212, such as stack entry 232A storing a reference state corresponding to cache line 214A, and stack entry 232B storing a reference state corresponding to cache line 214B. In an embodiment a cache (and./or cache manager) can utilize reference states, such as reference states stored in stack entries 232 of cache 210, to select a replacement cache line from among cache lines in a cache such as 210.

While the example of FIG. 2 can be a set of locations in a memory (or, other storage medium) to store reference states, this is not intended to limit embodiments. It would be apparent to one of ordinary skill that, in embodiments, a replacement stack can comprise any storage medium and/or structure capable of storing reference states, such as an array, or set, of hardware registers capable of, or configured to, store reference states. Accordingly, as used herein, "replacement stack" refers to a set of state locations included in any storage medium and/or structure which an embodiment can utilize to store reference states, and/or select replacement cache lines. It would be further apparent to one of ordinary skill in the art that, in embodiments, the number of reference states stored in a replacement stack can be the same as, or can differ from, the number of cache lines in the cache.

As previously described, reference states can include fields (e.g., sets of bits within a reference state) to record reference attributes such as requester, data source, reference class, reference category, and/or re-reference probability associated with data stored in a corresponding cache line. Accordingly, as shown in FIG. 2, reference states stored in each of stack entries 232 comprise identity field ID 234, source field SRC 236, reference class field CLASS 238, and reference category field CAT 240. ID 234 can identify, for example, a corresponding cache line among lines cache line 214. SRC 236 can comprise, for example, a source of a data reference (e.g., a data requester), and/or a source of data (e.g., a particular cache, memory, and/or processor), associated with data stored in a corresponding cache line. CLASS 238 can comprise a reference class, and CAT 240 can comprise a reference category, associated with data stored in a corresponding cache line.

While the example of FIG. 2 includes particular reference attributes of data in reference states corresponding to cache lines of a cache storing the data, this is not intended to limit embodiments, and it would be apparent to one of ordinary skill in the art that an embodiment can include some, or all, of such reference attributes in other elements of a cache (and/or, a computing system) in addition to, or in lieu of, including those attributes in reference states. For example, in an embodiment a cache directory can include particular reference attributes of data stored in a cache (e.g., initial reference versus re-reference data). In another example, a reference state can include, in addition to, or in lieu of reference attributes, a re-reference probability.

In embodiments, a reference state (and/or, in another structure, such as a cache directory) can include other information associated with data stored in a cache line, not shown in the example of FIG. 2. For example, a reference state (and/or, a cache directory) can include one or more count fields, associated with data stored in a cache line, such as a count of a number of references of a particular reference class and/or category to that data, and/or a number of references by particular data requesters to that data. It would be apparent to one of ordinary skill that a reference state can include any of a variety of attributes and/or statistics associated with data stored in a corresponding cache line such as can be useful to select a replacement line from among the cache lines corresponding to respective reference states.

As used herein, "reference state" further refers interchangeably to fields within a reference state and to the collective fields composing a reference state. Accordingly, "value" of a reference state refers interchangeably to the value of the state taken as a whole (e.g., as a complete sequence of bits), and to values of individual component fields (e.g., sub-sequences of bits within a state) of a reference state.

As previously described, in an embodiment, a cache, such as 210, can receive data reference inputs from a data reference interface, such as the example of 112, and/or SMP fabric 120, in FIG. 1 and the data reference inputs can include reference attributes of a data reference that results in the cache installing the data in the cache. Accordingly, in conjunction with installing that data, in an embodiment a cache can set a value of a reference state, corresponding to a replacement cache line to store the data, based on reference attributes received from the data reference inputs. For example, FIG. 2 depicts cache 210 coupled to interface 202, which comprises data reference inputs source input SRC 204, class input CLASS 206, and category input CAT 208. Interface 202 can be, for example, a data reference interface, similar to 112 in FIG. 1. SRC 204 can comprise, for example, a data requester, a source of referenced data, or a combination thereof. Similarly, CLASS 206 can comprise a reference class, such as previously described, and/or CAT 208 can comprise a reference category, such as also previously described, associated with data to install in cache 210.

In response to receiving data reference inputs from such an interface, cache 210 can select a replacement cache line from among cache lines 214 to install data in cache 210. Cache 210 can utilize inputs 204, 206, and/or 208 of interface 202, in association with a reference to the data, to set (or, otherwise compute or generate) values of fields 236, 238, and/or 240 in a reference state corresponding to a replacement cache line to install the data.

In an embodiment, a data reference interface can include other data reference inputs and/or data reference information not shown in the example of FIG. 2. For example, in FIG. 2, interface 202 can be, or can be included in, an interface of an SMP fabric (e.g., 112, 114, or 116 of FIG. 1) and interface 202 can include data reference inputs in addition to, or in lieu of, inputs such as 204, 206, and/or 208. Such a cache can receive such additional, or substitute, inputs and use the inputs to set values of a reference state corresponding to a replacement cache line to install data. Additionally, in embodiments data reference interface, such as 202, can include other inputs, outputs, and/or data not utilized by a cache to set values of a reference state corresponding to a cache line storing referenced data.

As previously described, reference attributes associated with data stored in a cache can correspond to a re-reference probability associated with that data. In an embodiment, a cache can compute, or otherwise generate, and associate a re-reference probability with data stored in a cache line based on reference states (and/or, values of fields of reference states) corresponding to that cache line. Such a cache can use reference states (e.g., values thereof) to select a replacement cache line from among cache lines of a cache (e.g., among cache lines 214 in FIG. 2) having a lower re-reference probability in comparison to other cache lines of that cache. For example, with reference to the example of FIG. 2, cache 210 can compare values of particular fields of reference states corresponding to different cache lines, such as one or more of SRC 236, CLASS 238, and/or CAT 240 in reference states stored in entries 232 of FIG. 2, to select a replacement cache line, such as among cache lines 214 corresponding to reference states stored in entries 232.

In embodiments, certain reference attributes can more closely correlate to a higher re-reference probability than other reference attributes. A reference category attribute (e.g., re-reference versus initial reference), for example, can more closely correlate to a higher re-reference probability than, for example, a reference class attribute (e.g., a use of data, such as data fetched or prefetched). Accordingly, in an embodiment a cache can select a replacement cache line based on comparing values of fields of reference states in a precedence order.

For example, such a cache can first compare values, among reference states, of a field (e.g., a reference category) that correlates to lower re-reference probabilities and can select candidate replacement cache lines corresponding to reference states having values of that field corresponding to re-reference probabilities relatively lower than that of other cache lines. Among a set of such candidate replacement lines, the cache can next compare values of fields having a next lower correlation to re-reference probability and can select another set of candidate replacement cache lines based, for example, on those next candidate replacement cache lines having values of that next field corresponding to re-reference probabilities relatively lower than that of other cache lines in the first set of candidate cache lines. The cache can repeat this process with other fields of a reference state until one or more cache lines are determined as having the relatively lowest re-reference probabilities and can select a replacement cache line from among the remaining candidate replacement lines.

In an embodiment a cache can utilize a replacement stack to store reference states corresponding to cache lines of the cache, and/or to select a replacement cache line. Such a cache can, further, store reference states in a replacement stack in a particular "selection order" to facilitate selecting a replacement cache line. For example, such a cache can store reference states having a particular value, or range of values, in one region, and store reference states having a different value, or range of values, within a different region of a replacement stack. Such a cache can order reference states stored in a replacement stack based on, for example, re-reference probabilities (and/or reference states themselves, as representing such probabilities) associated with data stored in cache lines corresponding to the reference states.

To illustrate, in the example embodiments of FIGS. 1 and 2, cache 130 in FIG. 1 and/or 210 in FIG. 2, can associate entries in a replacement stack with an address (e.g., a memory address or, alternatively, an index) within a replacement stack and the addresses (or, indices) can increase monotonically among stack entries. The cache can treat the lowest address (or, index) entry of the stack, for example, as the "top" of the stack, and the highest address (or, index) entry as the "bottom" of the stack. To facilitate selecting a replacement cache line, the cache can store reference states, corresponding to cache lines storing data having a lower re-reference probability, lower (e.g., in entries of the stack in a region at, or near, the bottom) in the replacement stack, and can place reference states, corresponding to cache lines storing data having a higher re-reference probability, in higher (e.g., in entries of the tack in a region at, or near, the top) in the replacement stack.

Using the example of FIG. 2 to illustrate in more detail, cache 210 can store reference states corresponding to cache lines having higher re-reference probabilities (e.g., as represented by reference states) in entries, among 232, located at, or near, the top of replacement stack 230, such as at, or near, entries 232A and/or 232B. Similarly, cache 210 can store reference states corresponding to cache line having lower re-reference probabilities in entries, among 232, located at, or near, the bottom (e.g., entry 232C) of replacement stack 230. Based on the locations within replacement stack 230 storing particular reference states, cache 210 can select a replacement cache line, among lines 214 of cache memory 212. In particular, cache 210 can select a replacement line from among cache lines corresponding to reference states stored at, or near the bottom, of replacement stack 230. Alternatively, in an embodiment a cache can store reference states in a replacement stack in any particular order, not necessarily based on an associated re-reference probability and/or value of a reference states and can compare reference states (such as previously described) within that stack to select a replacement cache line having a lower (or, lowest) re-reference probability in comparison to other cache lines. For example, to select a replacement cache line, using the example of FIG. 2, cache 210 can compare state values of all reference states in a replacement stack and can select a replacement cache line having a relatively lower (or, lowest) re-reference probability, based on those state values. As previously described, cache 210 can compare fields of the reference states in a precedence order to select a replacement cache line.

However, this is not intended to limit embodiments and it would be apparent to one of ordinary skill in the art that a cache, in an embodiment, can order, and/or compare, reference states in a replacement stack, and/or select a replacement cache line based on reference states and/or the order in which they are stored in a stack, according to a variety of comparisons and/or criteria.

In response to certain events (e.g., a reference to data in, or by, a cache. or installing data in a cache), an embodiment a cache can modify reference states (or, values of fields therein) and/or the order in which reference states are stored in a replacement stack. For example, in conjunction with installing data in a cache line, a cache can modify the order of reference states stored in the replacement stack so as to maintain an order placing reference states corresponding to cache lines storing data having higher re-reference probabilities higher, for example, in the replacement stack, and placing reference states corresponding to cache lines storing data having lower re-reference probabilities, lower in the replacement stack.

In embodiments, reference states associated with data to install, and/or data stored, in a cache line can include a "probability count", which can correspond to a reference probability associated with the data. A cache, in such an embodiment, can include a probability count in a reference state in addition to, or in lieu of, including other reference attributes in a reference state. Such a probability count, included in a reference state, can correspond to a re-reference probability associated with data stored in a cache line corresponding to that reference state, such that, for example, a higher probability count value corresponds to a higher re-reference probability associated with that data, and, for example, a lower probability count value corresponds to a lower re-reference probability associated with that data. Accordingly, as used herein, "higher", and "lower", in reference to probability counts (or, simply "counts") in reference states, is understood to refer to a count in a cache line in comparison to that of other cache lines in a cache.

A cache including a probability count in a reference state can determine (e.g., assign, compute, or otherwise generate) the probability count based on reference attributes of data to install, and/or data stored, in a cache line, such as reference attributes previously described (e.g., a requester and/or source of the data, a reference class of the data, and/or a reference category of the data). In conjunction with installing data in a cache line, the cache can record the probability count in a corresponding reference state (e.g., store the reference state in a location of a replacement stack).

Figure 3A:
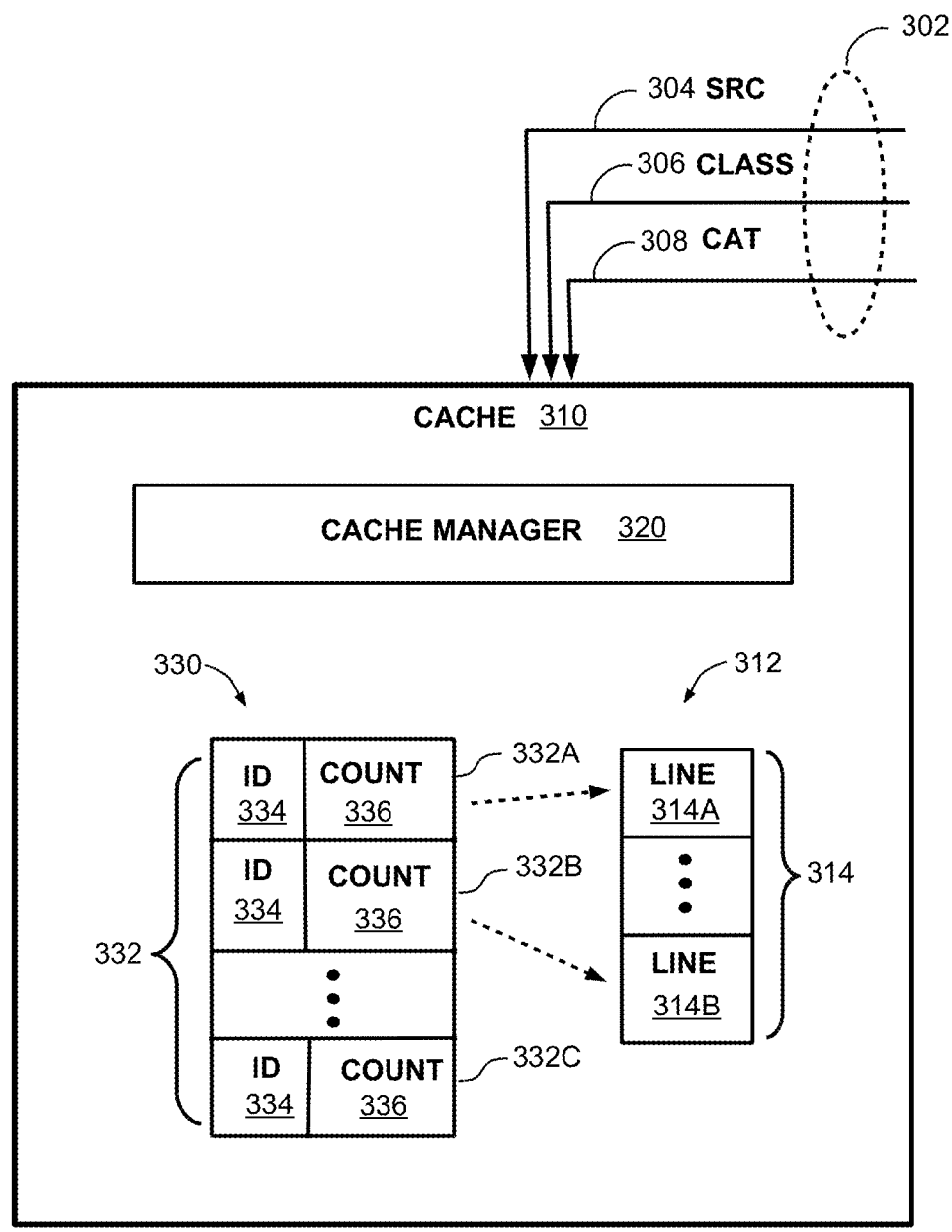
FIG. 3A is a block diagram illustrating an alternative example caching system, according to aspects of the disclosure.

FIG. 3A illustrates an alternative example embodiment of a cache that includes a probability count in reference states associated with cache lines of the cache. In FIG. 3A, cache 310 comprises cache manager 320, cache memory 312, and replacement stack 330. Cache 310 can operate in a manner similar to, for example, that described with reference to cache 130 in FIG. 1.

While FIG. 3A illustrates cache manager 320 and replacement stack 330 as included in cache 310, this is not intended to limit embodiments, and a cache manager, such as 320, and/or a replacement stack, such as 330, need not be included in a cache itself, such as cache 310. It would be apparent to one of ordinary skill in the art that component structures of caching system 300, illustrated in FIG. 3A, can be organized in any manner conducive to the design of a particular computer, or computing system, utilizing structures such as illustrated in FIG. 3A. Additionally, while FIG. 3 does not depict cache 310 including a cache directory, such as directory 138 in L3 cache 130 of FIG. 1, this is not intended to limit embodiments, and it would be apparent to one of ordinary skill in the art to include a cache directory in, or associated with, cache 310.

As shown in FIG. 3A, cache memory 312 comprises cache lines 314 and replacement stack 330 comprises stack entries 332. Similar to example cache 210, of FIG. 2, stack entries among 332 can store a reference state corresponding to a cache line among cache lines 314 of cache memory 312, such as a reference state in stack entry 332A corresponding to cache line 314A, and a reference state stored in stack entry 332B corresponding to cache line 314B (and/or to data stored in cache line 314B).

As further shown in FIG. 3A, each of stack entries 332 comprises ID 334 and COUNT 336, which can be fields of reference states of a cache, such as states stored in stack entries 332. Similar to ID 234 of reference states stored in stack entries 232 in FIG. 2, ID 334 in each of entries 332 of replacement stack 320 can identify cache lines corresponding to reference states stored in entries 332. For example, as shown in FIG. 3A, ID 334 in the reference state stored in entry 332A can identify cache line 314A as corresponding to that reference state. Further, in the reference states stored in the entries of replacement stack 332, COUNT 336 can be a probability count associated with data stored in a corresponding cache line. In conjunction with installing data in a cache line of cache 310 (e.g., among 314), Cache 310 can determine a value of COUNT 336, in a corresponding reference state stored in an entry among 332. Cache 310 can determine a value of COUNT 336, in a reference state, based on reference attributes associated with data to install, and/or data stored, in a cache line corresponding to that reference state.

Similar to the example of FIG. 2, cache 310 can receive data reference inputs of a data reference interface, such as 302, and the inputs can represent, or indicate, reference attributes of data to install, or data stored in, a cache. FIG. 3A further depicts interface 302 as comprising source input SRC 304, class input CLASS 306, and category input CAT 308, which are received by cache 310. Interface 302 can be an interface similar to interface 202, of FIG. 2, and inputs 304, 306, and/or 308 can be data reference inputs similar to respective inputs 204, 206, and 208 of FIG. 2. For example, SRC 304 can indicate a source of a reference to data, and/or a source of data, to install and/or data stored in a cache line among cache lines 314. CLASS 306 can indicate a reference class, and CAT 308 can indicate a reference category, associated with a reference to data to install, and/or data stored, in a cache.

Also similar to the example of FIG. 2, cache 310 can utilize inputs of interface 302, such as 304-308, to compute a probability count associated with data to install in a cache line. For example, as shown in FIG. 3A, stack entry 332A can correspond to cache line 314A. In conjunction with installing data in cache line 314A, cache 310 can receive data reference inputs of interface 302, such as 304-308, associated with a reference to the data to install in cache line 314A. Cache 310 can utilize the values of the inputs to compute (or, generate) and record, in COUNT 336 of stack entry 332A, a probability count based on reference attributes of the data to install, and/or data stored, in cache line 314A.

While the example of FIG. 3A depicts a reference state as comprising an ID and COUNT field, this is not intended to limit embodiments, and it would be apparent to one of ordinary skill in the art that an embodiment can include reference attributes, associated with data to install, or data stored, in a cache in a reference state and/or other structures. For example, an embodiment can include particular reference attributes of data stored in a cache, such as whether that data is categorized as initial reference or re-reference data, in a reference state, and/or in a cache directory (e.g., in an element of a cache directory corresponding to a cache line storing that data).

As previously described with reference to FIG. 2, embodiments can include, in a reference state (and/or, in another structure, such as a cache directory), other information associated with data stored in a cache line, not shown in the example of FIG. 3A. It would be apparent to one of ordinary skill that a reference state can include any of a variety of attributes and/or statistics associated with data stored in a corresponding cache line such as can be useful to select a replacement line from among the cache lines corresponding to respective reference states.

As previously described, embodiments can order reference states, such as the example of FIG. 3, among entries of a replacement stack to facilitate selecting replacement cache lines. Accordingly, embodiments can order reference states in a replacement stack based on values of probability counts included in the reference states. For example, with reference to the example embodiment of FIG. 3, entry 332A can represent a top of replacement stack 330 and entry 332C can represent a bottom of replacement stack 330. Cache 310 can order reference states in replacement stack 330 such that reference states having higher probability count states (or, having probability count states above a particular value) are stored in entries at, or near, the top of replacement stack 330 (e.g., entries among 232 nearer or including 332A or 332B). Similarly, cached 310 can order reference states in replacement stack 330 such that reference states having lower probability count states (or, having probability count states at or below a particular value) are stored in entries at or near the bottom of replacement stack 330 (e.g., e.g., in entries among 232 nearer or including 332C).

Accordingly, cache 310 can select a replacement cache line having a lower re-reference probability (as represented by a lower corresponding reference state probability count), among lines 314 of cache memory 312, from among cache lines corresponding to reference states stored at, or near, the bottom of replacement stack 330. For example, cache 310 can order reference states in entries of replacement stack 330 such that a reference state having a lowest probability count, compared to that of other reference states stored in replacement stack 330, is stored in entry 332C, and cache 310 can, accordingly, select a cache line corresponding to the reference state in entry 332C as a replacement cache line.

As previously described, in embodiments a cache can determine a probability count based on reference attributes associated with data to install, and/or data stored, in a corresponding cache line. For example, in an embodiment re-reference data can have a higher re-reference probability in comparison to initial reference data and, accordingly, in such an embodiment, a cache can determine a higher probability count value for data categorized as re-reference data (e.g., above a particular value) and a lower probability count value for data categorized initial reference data (e.g., at or below a particular value).

In embodiments a cache can determine count values relative to a "threshold count" value. Such a threshold count value can correspond, for example, to a fraction of a cache (e.g., a fraction of the total number of cache lines in a cache) to store data having one particular set of reference attributes, versus data having a different set of reference attributes. A cache, in such embodiments, can utilize that fraction of a cache to store data corresponding to probability counts above, for example, the threshold count value, and a complementary fraction of the cache to store data corresponding to probability counts at or below, for example, the threshold count value. Using a 4-bit binary value (e.g., a 4-bit count field in a reference state), for example, a probability count value can range from 0 to 15, and a threshold count value of 7, or 8 (approximately one half of the maximum value of 15) can correlate to approximately one half the cache lines of a cache to store data having one set of reference attributes and approximately one half the cache lines of a cache to store data having other reference attributes.

In another example, a threshold count value can correspond to a count value to modify (e.g., increment and/or decrement) using a particular modification value, such as to modify counts above a particular threshold count value using one modification value and to modify counts at or below that threshold count value using a different modification value. Utilizing a 4-bit counter and a threshold count value between 0 and 15, for example, a cache can initialize count values in reference states corresponding to cache lines storing data having higher re-reference probabilities to a value above the threshold value, and can initialize count values in reference states corresponding to cache lines storing data having lower re-reference probabilities to a value at or below the threshold value. Accordingly, the cache can decrement counts above a threshold of, for example, 8, by a lesser amount than counts at or below that value, such as to decrement counts corresponding to cache lines storing data having higher re-reference probabilities less quickly than counts corresponding to cache lines storing data having lower re-reference probabilities.

As previously described, in an embodiment a cache can order states within entries of a replacement stack based on values of counts included in reference states. For example, in embodiments a cache can store reference states in entries of a replacement stack based on a value of a reference state count relative to a threshold count. Such a cache can store reference states having count values greater than a threshold count, for example, in stack entries among one region of the stack (e.g., among entries at, or near, the top of the stack), and can store reference states having count values, for example, equal to, or less than, a threshold count in stack entries among a different region of the stack (e.g., among entries at, or near, the bottom of the stack).

Additionally, or alternatively, in an embodiment particular reference attributes can have an associated "probability weight" and, in such an embodiment, a cache can compute probability counts using probability weights associated with different reference attributes associated with data to install, and/or data stored, in a cache. For example, such a cache can determine a probability weight value with each of particular reference attributes, such as to each of a source of a data reference, a source of the data, a reference class of the data, and/or a reference category of the data. The cache can compute a probability count as a sum of probability weights associated with the particular reference attributes. For example, the cache can associate particular probability weights with each of different data requesters, different data sources, different reference classes, and/or different reference categories. The cache can then compute a probability count (e.g., in conjunction with installing data in a cache) based on (e.g., as a sum of) the probability weights corresponding to reference attributes of the data.

Figure 3B:
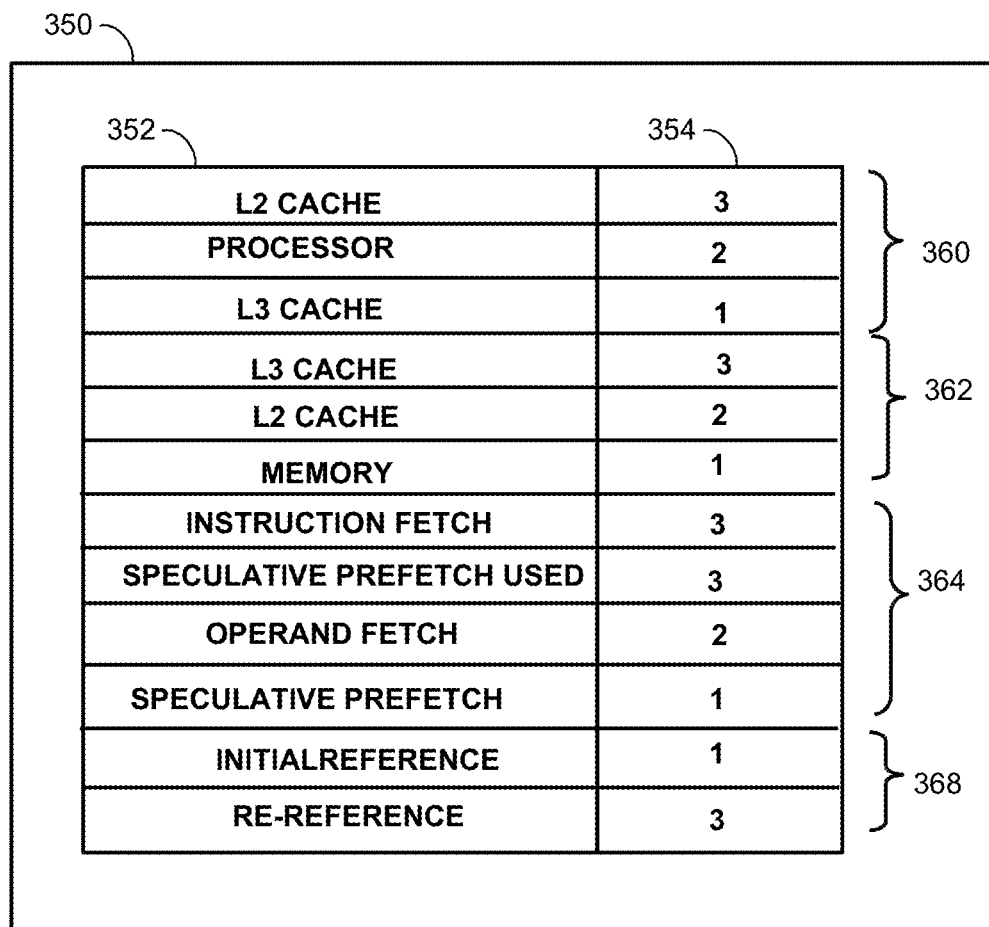
FIG. 3B is a block diagram that illustrates example probability weights that can be employed in a caching system, according to aspects of the disclosure.

FIG. 3B illustrates example probability weights that a cache can use to compute a probability count associated with data stored in a cache, in which the probability weights can correspond to reference attributes associated with that data, and in which each of the example weights can correspond to a re-reference probability associated with that data. In FIG. 3B, table 350 comprises columns 352 and 354, corresponding, respectively, to reference attributes and probability weights. FIG. 3B, table 350 further comprises rows 360, 362, 364, and 368, corresponding to particular reference attributes and corresponding probability weight values. In table 350, rows 360 can comprise data requesters, rows 362 can comprise data sources, rows 364 can comprise reference classes, and rows 368 can comprise reference categories. A cache can utilize probability weights, such as the examples of FIG. 3B, to compute a probability count, in a reference state, based on such reference attributes of corresponding data (e.g., data to install, and/or stored, in a cache).

As previously described, an embodiment can utilize a threshold count value, and, in such embodiments, a cache can utilize probability weights, or otherwise, compute probability counts, in reference states, such that the resulting values of probability counts corresponding to certain reference attributes (e.g., re-reference data) are above (i.e., exceed) the threshold count value, while the resulting values of probability counts corresponding to other reference attributes (e.g., initial reference data) are at, or below (e.g. equal to, or less than) the threshold count value.

In response to references to data stored in a cache, and/or in response to installing data in a cache (e.g., the same, or another cache), in an embodiment a cache can modify probability counts in reference states corresponding to cache lines storing data in a cache. For example, in response to an "increment event", a cache can increment probability counts in reference states and, in response to a "decrement event", a cache can decrement probability counts in reference states. Such a cache can modify probability counts in reference states in response to every increment and/or decrement event or, alternatively, in response to only particular types of increment and/or decrement events, in response to only every so many occurrences (e.g., every "Nth" occurrence) of increment and/or decrement events, or in response to only every so many (e.g., "Nth") occurrences types of increment and/or decrement events.

With respect to reference states corresponding to cache lines storing data in one cache, an increment event can comprise, for example, a reference to that data in another cache. For example, with respect to data stored in an L3 cache, a reference to data stored in a higher level cache, such as an L2 cache, can comprise an increment event that can cause the L3 cache to increment one or more probability counts in reference states corresponding to cache lines in the L3 cache (e.g., a probability count in a reference state corresponding to a cache line, in the L3 cache, storing data referenced in the L2 cache).

In another example, with respect to reference states corresponding to cache lines storing data in one cache, an increment event can comprise a reference to that data from another cache, such as for that other cache to obtain a copy of that data. For example, a reference to data stored in an L3 cache, from an L2 cache, can comprise an increment event that can cause the L3 cache to increment one or more probability counts in reference states corresponding to cache lines in the L3 cache (e.g., a probability count in a reference state corresponding to an L3 cache line storing that data).

With respect to reference states corresponding to cache lines storing data in a one cache, a decrement event can comprise, or be associated with, for example, installing data in that same cache, and/or installing data in another cache, such as a cache in another processor (or, another cache in a computer or computing system), or a cache in a different level of a cache hierarchy. With respect to reference states corresponding to cache lines storing data in one cache, a decrement event comprising installing data in another cache can comprise installing, in the other cache, the same data as that stored in the first cache, and/or installing, in the other cache, data different from that stored in the first cache. For example, an L3 cache can decrement counts in reference states corresponding to cache lines in that L3 cache in response to installing other data in that L3 cache, and/or in response to another cache, such as an L2 cache, installing data in that other cache.

In response to increment and/or decrement events, in an embodiment a cache can modify (e.g., increment, and/or decrement) probability counts in reference states of a cache using a particular modification value, such as incrementing, and/or decrementing, probability counts in reference states by a value of, for example, "1" (or, other values used consistently for all reference states). Alternatively, in response to an increment and/or decrement event, in embodiments a cache can modify probability counts in reference states of a cache using different modification values, and the differing modification values can correspond to counts in the reference states (as associated with, or representative of, re-reference probabilities) associated with particular reference attributes of data corresponding to different reference states.

For example, in response to an increment event associated with data stored in an L3 cache, in which the data is categorized as initial data (for example), a cache can increment a probability count, in a reference state corresponding to a cache line, in the L3 cache, storing that data, by a value of, for example, "1". In contrast, in response to an increment event associated with data stored in an L3 cache, in which the data is categorized as re-reference data (for example), a cache can increment a probability count, in a reference state corresponding to a cache line, in the L3 cache, storing that data, by a greater value, such as "2" (or, possibly more). Incrementing probability counts in reference states corresponding to cache lines storing re-reference data (as an example of data that can have a higher re-reference probability) can result in a cache retaining those corresponding cache lines among cache lines less eligible (e.g., corresponding to probability counts above a threshold count value, or stored higher in a replacement stack) to select as replacement cache lines.

In another example, in response to a decrement event associated with data stored in an L3 cache, in which the data is categorized as initial data (as an example of data that can have a lower re-reference probability), a cache can decrement a probability count, in a reference state corresponding to a cache line, in the L3 cache, storing that data, by a value of, for example, "2" (or, possibly more). In contrast, in response to a decrement event associated with data stored in an L3 cache, in which the data is categorized as re-reference data, a cache can decrement a probability count, in a reference state corresponding to a cache line, in the L3 cache, storing that data, by a lesser value, such as "1". Decrementing by lesser amounts probability counts in reference states corresponding to cache lines storing re-reference data (as an example of data that can have a higher re-reference probability) can result in a cache retaining those corresponding cache line among cache lines less eligible to select as replacement cache lines.

Alternatively, or additionally, in an embodiment a cache can increment and/or decrement probability counts using differing modification values based on the value of a probability count relative to a threshold count value, such as that previously described. For example, in response to an increment even a cache can increment probability counts having values above a threshold count value by a modification value greater than that used to increment probability counts having values at or below the threshold count value.

In another example, in response to a decrement event, a cache can decrement probability counts having values above a threshold count value by a value less than that used to decrement probability counts having values at or below the threshold count value. Incrementing and/or decrementing probability counts using modification values based on value of a probability count relative to a threshold count, such as the foregoing examples, can result in a cache retaining cache lines storing data having higher re-reference probabilities among cache lines less eligible to select as replacement cache lines.

In response to an increment and/or decrement event, in an embodiment a cache can modify a count in a reference state corresponding to just a particular cache line, and can leave reference states of other cache lines unmodified. Alternatively, in response to an increment and/or decrement event a cache can modify probability counts in reference states corresponding to more than one cache line, according to aspects of the increment event relating to re-reference probabilities represented in the counts.

Associated with modifications to probability counts in reference states of a cache, a cache can modify the order reference states are stored within a replacement stack, such as by locating reference states having higher count values, for example, higher in a replacement stack, and by locating reference states having lower count values, for example, lower in a replacement stack. Such a cache can, accordingly, select, as a replacement cache line, a cache line corresponding to a reference state at, or near, the bottom of a replacement stack.

Figure 4:
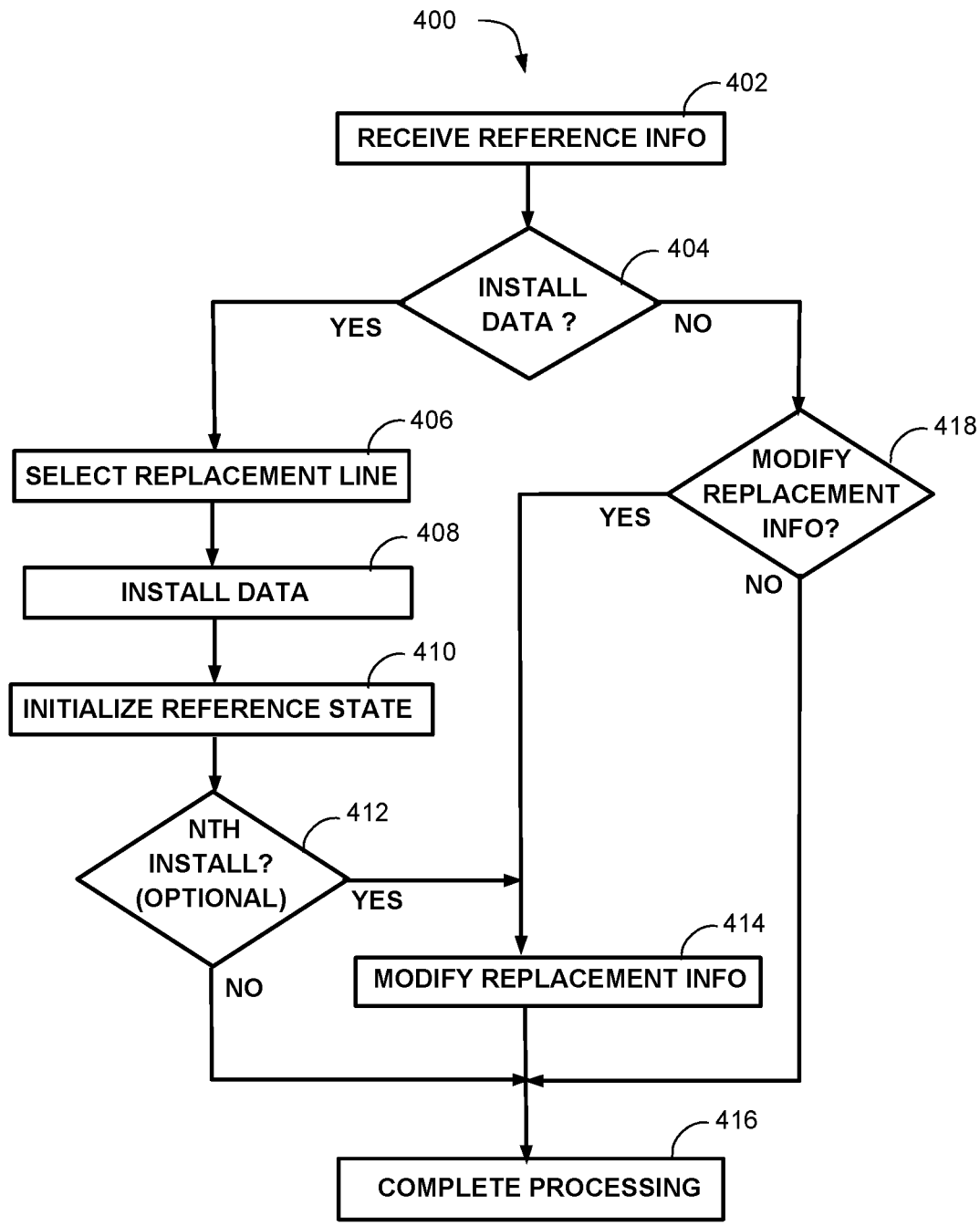
FIG. 4 is a flowchart that illustrates an example method to select a replacement location in a cache memory, according to aspects of the disclosure.

Embodiments can include a method of selecting a replacement cache line based on reference attributes associated with a reference to data. Accordingly, FIG. 4 illustrates example method 400 to select replacement lines of a cache using, or based on, reference attributes of data stored in the cache. Method 400 is described as performed by a cache, in the context of the foregoing examples of FIG. 1-3A, and using reference states and a replacement stack such as illustrated by the examples of FIGS. 2 and 3A included in a computer such as the example of computer 100 in FIG. 1. However, this is not to limit embodiments and it would be apparent to one of ordinary skill to modify the method according to alternative elements, computers, and/or computing systems within the scope of the disclosure. Further, in the description of method 400, the phrase "at 4xx" can be understood to mean "at step 4xx" or, "in operation 4xx", where "4xx" refers to a number of a particular operation (e.g., "402", "404", etc.) illustrated in FIG. 4.

At 402 of method 400, a cache receives reference (e.g., by means of a data reference interface) information associated with a data reference (e.g., a reference to data stored in a memory, or a cache). As previously described, reference information received at 402 can include, for example, reference attributes associated with a data reference and/or referenced data. At 402, an embodiment can receive the reference information from a data reference interface, such as the examples of interfaces 114 or 116 in FIG. 1, 202 in FIG. 2, and 302 in FIG. 3A. Information received at 402 can include the referenced data.

At 404, in response to receiving the reference information at 402, the cache determines whether or not to install, in the cache, data associated with the reference information received at 402. For example, if data associated with the reference information is not stored in the cache (e.g., a reference to data in use by a processor, or stored in a memory or another cache), at 404 the cache can determine to install the data in a cache line of the cache. In another example, if the reference information is associated with data evicted from another cache (e.g., another cache in a hierarchical cache), at 404 the cache can determine to install the evicted data in a cache line of the cache.

Alternatively, a cache can determine, at 404, not to install the data referenced at 402. For example, the cache can determine, based on reference information associated with a data reference, that data referenced is already stored, and valid, in a cache line of the cache. As previously described, at 404 the cache can utilize a structure such as a cache directory, to determine if referenced data is, or is not, stored in a cache, and/or to determine whether or not to install the data based on the reference information.

If, at 404, the cache determines to install the data in the cache, at 406 the cache selects a cache line to store installment data associated with the reference information received at 402. The cache can have unused cache lines (e.g., invalid cache lines) and can select an unused cache line to store the data. Alternatively, a cache can have no unused cache lines (e.g., all cache lines contain valid cached data) and the cache can select a replacement cache line within the cache from among cache lines storing data. To select a replacement cache line, at 406 the cache can, for example, select a replacement cache line based on reference attributes associated with data stored in cache lines of a cache, such as described in reference to FIGS. 2 and 3A. The cache can utilize, for example, reference states in a replacement stack, such as also described in reference to FIGS. 2 and 3A.

At 408 the cache installs the data in the selected cache line and, at 410, the cache initializes a reference state corresponding to the selected replacement cache line. To initialize a reference state (or, fields included in a reference state), at 410, the cache can utilize reference attributes included in reference information received at 402, such as previously described in reference to FIGS. 2 and 3A.

At 412, the cache can, optionally, determine if the installation of data received with the reference information at 402 represents a particular, "Nth", occurrence of an installation of data in the cache. In embodiments, "N" can correspond to every installation (e.g., where "N"=1) of data in the cache, or can correspond to a multiple number of occurrences such as a multiple chosen in accordance with, for example, statistical reference patterns to data stored in a cache, and/or corresponding to an Nth occurrence of installing data in a level of a cache (e.g., L3 versus L2 or L1) in a hierarchical cache.

If the cache does not perform the optional operation at 412, or if the cache performs the optional operation at 412, and determines, at 412, that the installation is an "Nth" occurrence of an installation, at 414 the cache modifies replacement information associated with the cache lines of the cache, such as described in reference to FIGS. 2 and 3A. For example, at 414, in response to installing the data in the cache, at 408, the cache can modify values (e.g., increment and/or decrement probability counts) of reference states corresponding to cache lines of the cache other than the selected cache line. Additionally, or alternatively, the cache can, for example, modify the order in which reference states are stored in a replacement stack.

If the cache performs the operation at 412, and the cache determines, at 412, that the installation is not an "Nth" occurrence of an installation, or if the cache performs the modification operation at 414, the cache completes processing the reference to the data initiated in response to receiving the reference information at 402. In an embodiment, completing processing, at 416, can include, for example, communicating information related to installing the data to other elements of a computing system, such as to other caches in a computing system. In another example, completing processing, at 416, can include evicting data from the cache (and/or evicting the data from one or more other caches).

If, at 404 the cache determines not to install the data in the cache, at 418 the cache determines whether or not to modify replacement information (e.g., replacement states and/or the order replacement states are stored in a replacement stack) associated with the cache lines of the cache. At 404, the cache can determine to not install data in a cache line because, for example, the data associated with reference information received at 402 is stored in the cache. In another example, at 404, the cache can determine to not install data in a cache line because the data is, or will be, cached in another cache in the computing system (e.g., a higher level cache in a hierarchical cache).

At 414, the cache can modify replacement information, such as reference states corresponding to cache lines in the cache, and/or the order in which reference states are stored among entries of a replacement stack. For example, at 414, the cache, the cache can modify reference states stored among entries of a replacement stack, such as to modify fields of the reference states, and/or to increment and/or decrement probability counts included in the reference states. In an embodiment, the cache can modify the reference states, at 414, based on reference attributes associated with the reference information received at 402, such as described in reference to FIGS. 2 and 3A.

In another example, at 414 the cache can modify the order in which reference states are stored among entries of a replacement stack, such as to store reference states corresponding to data, stored in cache lines of the cache, having particular associated reference probabilities, in entries located in one region of a replacement stack (e.g., entries located at, or near, the top of the stack), and to store reference states corresponding to data, stored in cache lines of the cache, having other associated reference probabilities in entries located in another region of a replacement stack (e.g., among entries located at, or near, the bottom of the stack), such as described in reference to FIGS. 2 and 3A. At 416, the cache completes processing, such as previously described.

Figure 5:
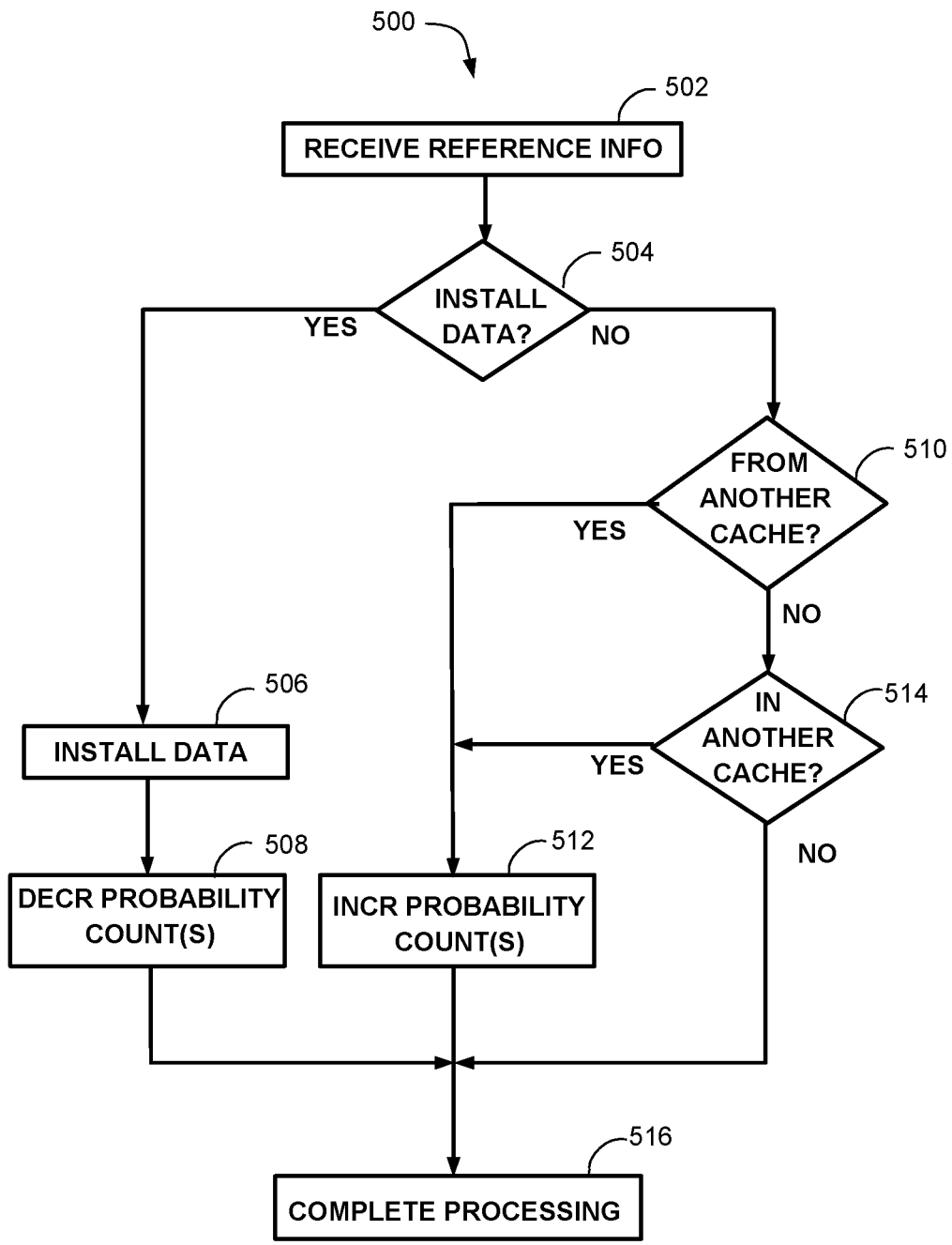
FIG. 5 is a flowchart that illustrates an alternative example method to select a replacement location in a cache memory, according to aspects of the disclosure.

FIG. 5 illustrates another example method which embodiments can employ to select replacement lines of a cache. FIG. 5 illustrates example method 500 for selecting replacement lines of a cache using reference states that include a probability count, such as described in reference to FIG. 3A. Similar to the foregoing description of method 400, in FIG. 4, Method 500 is described as performed by a cache, in the context of the foregoing example of FIGS. 1-3A, and using reference states and a replacement stack such as the example of FIG. 3A included in a computer such as the example of computer 100 in FIG. 1. However, this is also not to limit embodiments and it would be apparent to one of ordinary skill to modify the method according to alternative elements, computers, and/or computing systems within the scope of the disclosure. Further, in the description of method 500, the phrase "at 5xx" can be understood to mean "at step 5xx" or, "in operation 5xx", where "5xx" refers to a number of a particular operation (e.g., "502", "504", etc.) illustrated in FIG. 5.

At 502 of method 500, a cache receives information (e.g., by means of a data reference interface) associated with a data reference. In an embodiment, the information received at 502 can include, for example, reference attributes of the data, and/or inputs of an interface (e.g., a data reference interface) corresponding to reference attributes of the data, such as described in reference to operation 402 of FIG. 4.

At 504, in response to receiving the reference information at 502, the cache determines whether or not to install, in the cache, data associated with the reference information received at 502. At 504 the cache can determine to install the data in a cache line of the cache for reasons, and/or in a manner, similar to that described in reference to operation 404 in FIG. 4.

If, at 504, the cache determines to install data associated with the reference information received at 502, at 506 the cache installs the data. The cache can perform operation 506 utilizing, for example, operations such as 406-412, 414, and/or 416 of example method 400 in FIG. 4.

At 508 the cache decrements probability counts in reference states corresponding to cache lines storing data in the cache. For example, at 508, in an embodiment the cache can decrement probability counts in every reference state corresponding to a valid cache line. At 508, the cache can decrement probability counts of reference states based on reference attributes of data stored in cache lines corresponding to the particular reference states. For example, as previously described in reference to FIG. 3A, at 508 the cache can decrement probability counts of reference states corresponding to one or more particular reference attributes (e.g., initial reference data) but not decrement probability counts of reference states corresponding to one or more other reference attributes (e.g., re-reference data). In another example, at 508 the cache can decrement probability counts of reference states corresponding to one or more particular reference attributes (e.g., initial reference data) using one decrement value, and can decrement probability counts of reference states corresponding to other reference attributes (e.g., re-reference data) using a different decrement value (e.g., a lesser value than that used to decrement probability counts corresponding to initial reference data).

At 508, in an embodiment, the cache can decrement probability counts in reference states in response to each installation of data in the cache. Alternatively, in an embodiment, the cache can count occurrences of installations of data in that (and/or another) cache and, based on that count, can decrement probability counts in reference states only in response to a particular incremental number (e.g., every "Nth") of such occurrences. With respect to data stored in a particular cache, the cache can decrement probability counts, and/or count installations, in response to installations of, data in that cache, installations of data in another cache, installations of particular types of data (e.g., data having particular reference attributes), and/or installations in a cache in response to particular circumstances, and/or conditions, of elements of a computing system, or data referenced.

At 516, the cache completes processing associated with the results of operation 508. In embodiments, at 516, in response to performing operation 508, completing processing can include, for example, the cache modifying the state of a replacement stack, such as modifying the order in which reference states are stored in the stack, such as described in reference to FIG. 3A. In another example, at 516, in response to performing operation 508, completing processing can include evicting data from a cache (e.g., data in a cache line corresponding to reference states modified at 508, or in another, related cache).

If, at 504, the cache determines not to install the data (e.g., the data is stored in a valid cache line of the cache), at 510 the cache determines if the reference is from another cache (e.g., another cache in a hierarchical cache) to data stored in the cache. At 504, the cache can determine not to install data associated with reference information received at 502 for reasons, and/or in a manner, similar to that described in reference to operation 404 of method 400 in FIG. 4.

If, at 510, the cache determines that the reference is from another cache, at 512 the cache increments a probability count in a reference state corresponding to a cache line storing the data. Alternatively, if the cache determines, at 510, that the reference is not from another cache, at 514, the cache determines if the reference is to data stored in the cache and also in another cache (e.g., another cache in a hierarchical cache). If so, at 512, the cache increments a probability count in a reference state corresponding to a cache line storing the data in the cache itself (i.e., the cache performing method 500).

At 512 the cache can increment a probability count corresponding to a cache line storing the data, in the cache, associated with the reference information received at 502. The cache can increment a probability count by a particular amount, at 512, in association with reference information received at 502. In an embodiment the cache can increment the count using the same increment amount each time the cache performs an increment at 512. Alternatively, in an embodiment, the cache can increment a probability count (included in a particular reference state), at 512, by an amount based on, for example, reference information received at 502, and/or reference attributes (e.g., such as described in reference to FIGS. 2 and 3A) of data stored in a cache line associated with reference information received at 502.

For example, at 512, the cache can determine if the reference information is associated with data, stored in the cache, having a high re-reference probability. Based on, for example, reference attributes associated with data stored in the cache, and/or the reference information received at 502, the cache can make the determination, at 512, that the data has a relatively higher re-reference probability (e.g., re-reference data, as compared to initial reference data). Accordingly, at 512 the cache can increment a probability count in a reference state corresponding to a cache line storing the data, and can increment the count by an amount greater than, for example, an amount used to increment a probability count corresponding to a cache line storing data having a lower re-reference probability.

Conversely, at 512 the cache can determine, such as based on reference attributes associated with data stored in the cache, and/or the reference information received at 502, that the reference information is associated with data, stored in the cache, having a relatively lower re-reference probability (e.g., initial reference data, as compared to re-reference data). Accordingly, the cache can increment a probability count in a reference state corresponding to a cache line storing that data, and can increment the count by an amount less than, for example, an amount used to increment a probability count in a reference state corresponding to a cache line storing data (e.g., re-reference data) having a relatively higher re-reference probability.

At 516, the cache completes processing related to incrementing a probability count at 512. In embodiments, completing processing, at 516, can comprise operations such as previously described in relation to completing processing, at 516, related to operation 508.

While method 500 is described in the context of probability counts included in reference states, this is not intended to limit embodiments. It would be apparent to one of ordinary skill in the art that, in a method such as the example of method 500, probability counts need not be included in reference states, and can be included in other structures and/or elements of a cache (e.g., a cache directory), and/or a computing system, in lieu of, or in addition to, including probability counts in reference states.

It would be further apparent to one of ordinary skill in the art that the method can apply to a cache in any particular application, and/or storing data of any particular type and/or size in a cache. For example, an embodiment can include a Translation Lookaside Buffer (TLB) to cache, for example, particular address translations, such as address translations from a virtual or, logical, address of data to a real or, physical, address of a location in a memory storing that data.

In embodiments, a TLB can be similar to, and/or operate in a manner similar to, a cache such as illustrated by the example caches of FIGS. 1, 2, and 3A, and can cache the results of address translations (e.g., real or, physical, address) in locations within a TLB. Such a TLB can associate reference states, such as previously described with reference to FIGS. 2 and 3A, with entries storing translations in a TLB, and the reference states can be associated with attributes of the addresses (and/or data associated with addresses) stored in the TLB. The TLB can utilize such reference states to select replacement locations (e.g., entries) in the TLB to store replacement translations.

Figure 6:
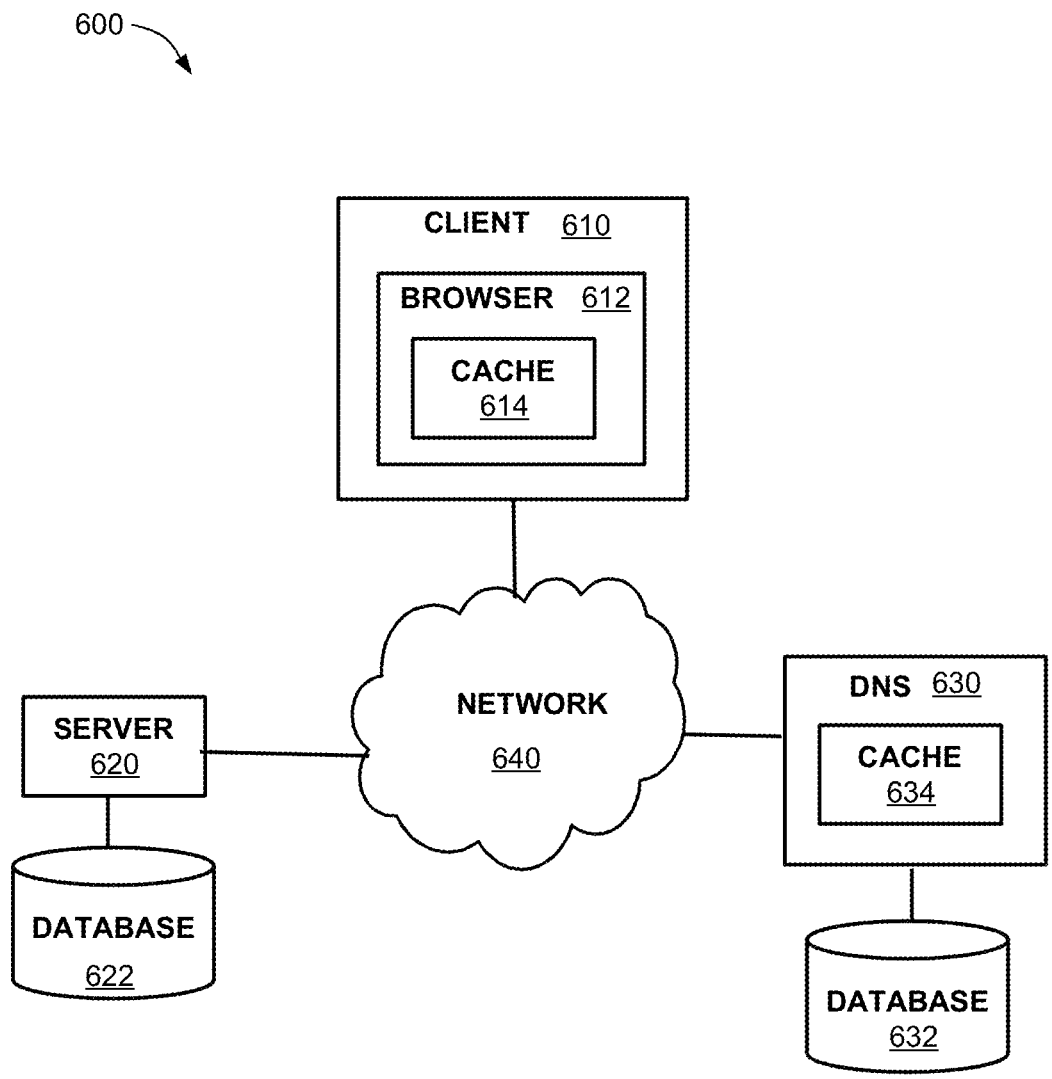
FIG. 6 is a block diagram illustrating a networked computing system, according to aspects of the disclosure.

In another example, a networked computing system can utilize a cache similar to the examples of FIGS. 1, 2, and/or 3A to cache data referenced by various elements of the computing system. FIG. 6 illustrates example networked computing system 600. In the example embodiment of FIG. 6, networked computing system comprises computing client 610, server 620, and Directory Name Server (DNS) 630. FIG. 6 further illustrates client 610, server 620, and DNS 630 coupled to network 640.

In embodiments, client 610, server 620, and/or DNS 630 can be computers, such as in the example of computer 100 in FIG. 1, and/or can be elements of a computer (including elements of the same or a different computer), such as the example of computer 100 in FIG. 1. However, this is not to limit embodiments, and it would be apparent to one of ordinary skill in the art that client 610, server 620, and/or DNS 630 can be embodied in any type of computing device and/or application of a computing device, within the scope of the disclosure.

Computers 610, 620, and/or 630 can communicate by means of network 640. In embodiments, a network, such as 640, can comprise any type of network and/or interface suitable to couple elements of a computing system, including hardware and/or software embodiments of such methods of networking elements of a computing system. For example, network 640 can be a local area network, such as an Ethernet, or can be, or can be included in, a wide area network, such as the Internet. In another example, network, such as 640, can be, or can include, data buses, I/O buses, I/O links, switches, routers, and/or gateways and bridges, and can be, or include, software (e.g., a "communications software stack") that interconnect elements of a computing system.

A networked system, such as the example of FIG. 6, can utilize a cache, similar to the foregoing examples of FIGS. 1, 2, and/or 3A, to cache data communicated among elements (e.g., 610, 620, and/or 630) of the system. For example, as shown in FIG. 6, client 610 can include a Web browser application, such as browser 612, to enable client 610 to retrieve and/or utilize World Wide Web (hereinafter "Web") information (e.g., data files; and/or text, picture, audio, or video media data) from another element of the system, such as server 620. As shown in the example of FIG. 6, server 620 can include, or be coupled to a database, such as database 622. In an embodiment, a database, such as 622, can include web information, and can provide (and/or receive) Web information to (or, from) another element of a computing system, such as client 610.

In a networked computing system such as 600, a location storing information, such as Web information, can identify Web information by a mnemonic, such as a Universal Record Locator, or "URL", used with the Web. A networked computing system can associate a URL, for example, with a network address—such as a Transmission Control Protocol (TCP) address, an Internet Protocol (IP) address, and/or a Media Access Control (MAC) address—of an element of the computing system having the information. One or more elements of a computing system can translate an identity of information (e.g., a URL) to a network address (e.g., a TCP, IP, and/or MAC address) associated with an element of the computing system having the information.

For example, with reference to FIG. 6, server 620 can store Web information in database 622 and client 610 can access data in that database from server 620. Client 610 can identify the information by a URL, and DNS 630 can translate that URL to a network address associated with server 620 and/or database 622. DNS 630 can associate URLs with network addresses using a database, such as 632. Following a translation from a URL to a network address, DNS 630 can provide the results of the translation (e.g., a TCP, IP, and/or MAC address) to client 610, and/or browser 612.

One or more elements of a networked computing system can repeatedly reference particular information (e.g., Web information), and/or locations of information in the system. Using the example of FIG. 6 to illustrate, browser 612 can repeatedly reference particular Web information and/or URLs associated with that particular Web information. In another example, a computing system, such as 600, can have a plurality of client elements, such as 610, and, the clients can, collectively, repeatedly reference particular Web information and/or URLs associated with that Web information.

Accordingly, a networked computing system, such as 600, can utilize a cache to store the information and/or locations (e.g., URLs, TCP, IP, and/or MAC addresses) storing the information. For example, as shown in FIG. 6, browser 612 includes cache 614 and DNS 630 includes cache 634. While not shown in FIG. 6, server 620 and/or network 640 can include a cache. In embodiments caches, such as 614 and/or 634, can be caches similar to the example of cache 130 in FIG. 1.

In embodiments such as the example of FIG. 6, particular URLs can have a higher re-reference probability than other URLs. As repeated reference to particular URLs can require repeated translation of those URLs to associated network addresses, elements of the computing system can cache such translations, such as DNS 630 caching translations in cache 634, and/or browser 612 caching translations in cache 614.

In embodiments, information (e.g., Web information) referenced in a networked computing system, and/or locations associated with information referenced in a networked computing system (e.g., URLs and/or network addresses), can have reference attributes similar to those previously described (e.g., a requester, a data source, and/or data attributes). URLs can have a re-reference probability corresponding to reference attributes associated with the information identified by a URL, and/or locations storing that information.

As previously described with reference to FIGS. 1, 2, and 3A, such attributes, can include a data requester and/or data source, and/or data attributes. A data requester and/or a data source, in embodiments, can comprise, for example, a Web browser, a server and/or client element in a networked computing system, a DNS, and/or an element of a network (e.g., a bridge or router). Data attributes can comprise a reference class and/or data category. For example, in an embodiment a reference class can comprise a type of data, such as text, image data, video data, audio data, and/or meta-data (e.g., data describing data of other types). A reference class can include that data is a URL, a network address (e.g., TCP, IP, and/or MAC address), a file, streaming data, and other types of data that can be communicated within a network, and/or associated with network communications. In embodiments, similar to the examples of FIGS. 1-3A, a reference category can include, for example, re-reference versus initial reference data. Such reference attributes can correspond to higher and/or lower re-reference probabilities of data stored in a cache such as 614 and/or 634.

Accordingly, in the example embodiment of FIG. 6, caches 634 and 614 can be similar to the caches illustrated by the examples of FIGS. 1, 2, and/or 3A, and can include reference states associated with locations within the caches storing the results of a previous translation. The reference states can include reference attributes corresponding to a re-reference probability associated with those translations, such as previously described in reference to the examples of FIGS. 1, 2, and/or 3A. Caches, such as 634 and/or 614, can utilize reference states, and/or a replacement stack storing reference states, to select replacement locations in a cache (e.g., 614 and/or 634) to store Web information, URLS, and/or network addresses.

A networked computing system can employ methods, such as the examples of methods 400, in FIG. 4, and 500 in FIG. 5. For example, a cache (and/or, an element of a networked computing system that includes, or is associated with, a cache) can perform an operation to receive reference data reference information, as in operation 402 of method 400, and/or operation 502 of method 500. To illustrate, a cache employed by (or, alternatively, included in) a web browser, for example, can receive reference attributes and/or data to install, or data stored, in a cache. Such a cache can receive the reference information by an interface, such as an application programming interface (API), or a software "stream", "pipe", "port" or "channel". Such an interface can include, for example, an interface of a software TCP/IP "stack. In response to receiving the reference information, s the cache can perform related operations of methods 400 and/or 500.

Understanding the examples of FIGS. 1-6, it would be apparent to one of ordinary skill in the art to employ aspects, such as systems and/or methods, of the disclosure in computing systems including, and/or alternative to, the foregoing examples of FIGS. 1-6. The flowchart and block diagrams in the Figures illustrate the architecture, functionality, and operation of possible implementations of systems and/or methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A cache, the cache comprising:
a data reference interface communicatively coupled to the cache;
cache-line reference attributes associated with cache-line data;
reference states based on the cache-line reference attributes;
a first storage medium comprising a set of data locations;
a second storage medium comprising state locations;

a replacement stack comprising cached-data reference states stored in state locations of the second storage medium, each of the cached-data reference states associated with cache-line data stored in a respective cached-data location among the cached-data locations, each of the cached-data reference states comprising reference states based on cache-line reference attributes associated with cache-line data stored in the respective cached-data location, the cached-data reference states stored in the state locations of the replacement stack according to a first order, among the state locations of the replacement stack, to store the cached-data reference states, the first order based on a set of the cache-line reference attributes and the cached-data reference states; and, a cache manager configured to select, in response to receiving, from the data reference interface, first reference attributes associated with first cache-line data to store in the cache, a replacement data location to store the first cache-line data, the first reference attributes among the cache-line reference attributes, the replacement data location selected, from among the cached-data locations, based on the first reference attributes and the first order.

2. The cache of claim 1, wherein the cache manager is further configured to, in response to receiving, from the data reference interface, second reference attributes, comprising reference attributes among the cache-line reference attributes, modify a first reference state, among the cached-data reference states, the first reference state modified based on at least one of the second cache-line reference attributes, the first reference state, and a first state location, among the state locations, storing the first reference state.

3. The cache of claim 2, wherein the cache manager is further configured to:
determine, in response to the modifying the first reference state, a second order, among the state locations of the replacement stack, to store the cached-data reference states, the second order based on the set of the cache-line reference attributes and the cached-data reference states; and,
store a second reference state, among the cached-data reference states, in a second state location of the replacement stack, the second state location selected according to the second order.

4. The cache of claim 1, wherein the reference states comprise a probability count;
wherein the cache manager is further configured to compute the probability count included in each of the cached-data reference states based on the cache-line reference attributes associated with the cache-line data stored in the respective cached-data location; and,
wherein the cache manager configured to select the replacement data location comprises the cache manager further configured to select the replacement data location based, at least in part, on the probability count included in a cached-data reference state associated with the replacement data location.

5. The cache of claim 4, wherein reference attributes, among the cache-line reference attributes, correspond to respective weighted re-reference probabilities; and,
wherein the cache manager is further configured to compute the probability count included in each of the cached-data reference states based on the weighted re-reference probabilities.

6. The cache of claim 4, wherein the cache manager is further configured to:

store the first cache-line data in the replacement data location;
determine that the storing the first cache-line data in the replacement data location corresponds to an Nth occurrence of the cache storing cache-line data in the cached-data locations; and,
based on the storing the first cache-line data corresponding to the Nth occurrence, decrement a first probability count, included in a first reference state among the cached-data reference states.

7. The cache of claim 6, wherein the cache manager configured to decrement the first probability count comprises the cache manager configured to decrement the first probability count by a decrement amount based on at least one of the first reference state and a first state location, among the state locations, storing the first reference state, the first state location based on the first order;
first data location based, a least in part, on the count included in the first reference state.

8. The cache of claim 6, wherein the cache manager is further configured to:
determine, in response to the decrementing the first probability count, a second order, among the state locations of the replacement stack, to store the cached-data reference states, the second order based on the set of the cache-line reference attributes and the cached-data reference states; and,
store a second reference state, among the cached-data reference states, in a first state location of the replacement stack according to the second order.

9. The cache of claim 4,
wherein the cache manager is further configured to, in response to receiving, from the data reference interface, second reference attributes, comprising reference attributes among the cache-line reference attributes, increment a first probability count, included in a first reference state among the cached-data reference states, using an amount to increment the first probability count based on at least one of the second reference attributes, the first reference state, and a first state location, among the state locations, storing the first reference state.

10. The cache of claim 9, wherein the cache manager is further configured to:
determine, in response to the incrementing the first probability count, a second order, among the state locations of the replacement stack, to store the cached-data reference states, the second order based on the set of the cache-line reference attributes and the cached-data reference states; and,
store a second reference state, among the reference states stored in the state locations, in a second state location of the replacement stack according to the second order.

11. A method for managing a cache, the method comprising:
receiving, from a data reference interface, first reference attributes associated with first cache-line data to store in the cache; and,
selecting, in response to the receiving the first reference attributes, a replacement data location to store the first cache-line data, wherein the replacement data location is selected, from among cached-data locations of a first storage medium, based on cached-data reference states, stored in state locations of a replacement stack, and a first order, among the state locations of the replacement stack, to store the cached-data reference states;
wherein the cached-data reference states are based on reference attributes associated with cache-line data stored in a respective cached-data location among the cached-data locations; and, wherein the first order is based on a first set of reference attributes among the reference attributes associated with the cache-line data stored among the cached-data locations.

12. The method of claim 11, the method further comprising:

receiving second reference attributes from the data reference interface; and, modifying, in response to the receiving the second reference attributes, a first cached-data reference state, among the cached-data reference states, the first cached-data reference state modified based on the second reference attributes.

13. The method of claim 12, the method further comprising:

determining, in response to the modifying the first cached-data reference state, a second order, among the state locations of the replacement stack, to store the cached-data reference states, the second order based on the first set of reference attributes and the cached-data reference states; and, storing a second cached-data reference state, among the cached-data reference states, in a second state location of the replacement stack according to the second order.

14. The method of claim 11, wherein the cached-data reference states comprise a probability count;

wherein the method further comprises computing the probability count, included in each of the cached-data reference states, based on a second set of the reference attributes associated with the cache-line data stored in the respective cached-data location; and, wherein the replacement data location selected based on the cached-data reference states comprises the replacement data location selected based, at least in part, on the probability count included in a cached-data reference state associated with the replacement data location.

15. The method of claim 14, wherein reference attributes, among the second set of reference attributes, correspond to respective weighted re-reference probabilities; and, wherein the method computing the probability count included in each of the cached-data reference states comprises computing the probability count based on the weighted re-reference probabilities.

16. The method of claim 14, the method further comprising:

storing the first cache-line data in the replacement data location;

determining that the storing the first cache-line data in the replacement data location corresponds to an Nth occurrence of the cache storing cache-line data in the cached-data locations; and decrementing, based on the storing the first cache line data corresponding to the Nth occurrence, a first probability count, included in a first cached-data reference state among the cached-data reference states.

17. The method of claim 16, wherein the decrementing the first probability count comprises decrementing the first probability count by an amount based on at least one of the first cached-data reference state and a first state location, among the state locations, storing the first cached-data reference state, the first state location based on the first order.

18. The method of claim 16, the method further comprising:

determining, in response to the decrementing the first probability count, a second order, among the state locations of the replacement stack, to store the cached-data reference states, the second order based on the first set of reference attributes and the cached-data reference states; and, storing a second cached-data reference state, among the cached-data reference states, in a second state location of the replacement stack according to the second order.

19. The method of claim 14, the method further comprising incrementing, in response to receiving second reference attributes from the data reference interface, a first probability count included in a first cached-data reference state, among the cached-data reference states, using an amount to increment the first probability count based on at least one of the second reference attributes, the first cached-data reference state, and a first state location, among the state locations, storing the first cached-data reference state.

20. The method of claim 19, the method further comprising:

determining, in response to the incrementing the first probability count, a second order, among the state locations of the replacement stack, to store the cached-data reference states, the second order based on the first set of reference attributes and the cached-data reference states; and, storing a second reference state, among the cached-data reference states, in a second state location of the replacement stack according to the second order.

* * * * *